(12) United States Patent
Sullivan et al.

(10) Patent No.: US 6,648,778 B2
(45) Date of Patent: *Nov. 18, 2003

(54) LOW SPIN GOLF BALL UTILIZING PERIMETER WEIGHTING

(75) Inventors: Michael J. Sullivan, Barrington, RI (US); R. Dennis Nesbitt, Westfield, MA (US)

(73) Assignee: Callaway Golf Company, Carlsbad, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 09/903,369

(22) Filed: Jul. 11, 2001

(65) Prior Publication Data

US 2002/0013185 A1 Jan. 31, 2002

Related U.S. Application Data

(62) Division of application No. 09/248,627, filed on Feb. 11, 1999, now Pat. No. 6,261,193, and a continuation-in-part of application No. 09/049,868, filed on Mar. 27, 1998, now Pat. No. 5,984,806, which is a continuation-in-part of application No. 08/782,221, filed on Jan. 13, 1997, now Pat. No. 6,015,356, which is a continuation-in-part of application No. 08/716,016, filed on Sep. 19, 1996, now Pat. No. 5,820,489, which is a continuation-in-part of application No. 08/255,442, filed on Jun. 8, 1994, now abandoned, which is a continuation of application No. 08/054,406, filed on Apr. 28, 1993, now Pat. No. 5,348,304.
(60) Provisional application No. 60/042,428, filed on Mar. 28, 1997.

(51) Int. Cl.[7] ........................ A63B 37/04; A63B 37/06
(52) U.S. Cl. ........................ 473/377; 473/373; 473/374; 473/378; 473/384
(58) Field of Search ........................ 473/373, 374, 473/359, 365, 383, 378, 384

(56) References Cited

U.S. PATENT DOCUMENTS

| 878,254 A | 2/1908 | Taylor |
|---|---|---|
| 906,932 A | 12/1908 | Riblet |

(List continued on next page.)

FOREIGN PATENT DOCUMENTS

| AU | 192618 | 1/1983 |
|---|---|---|
| EP | 600721 | 1/1997 |

(List continued on next page.)

OTHER PUBLICATIONS

Du Pont—Surlyn Grade Selector Guide (1985).
"The Curious Histroy of the Golf ball, Mankind's Most Fascinating Sphere," John Stuart Martin, Horizon Press, N. Y. 1968. See pp. 88 and 89.

*Primary Examiner*—Peter Vo
*Assistant Examiner*—Paul Kim

(57) ABSTRACT

The present invention is directed to a golf ball comprising a soft core and a hard cover to produce a resulting golf ball having a reduced spin rate. In this regard, a core is provided and metal particles, or other heavy weight filler materials, are included in the cover compositions. This results in a golf ball exhibiting enhanced perimeter weighting. Preferably, the particles are included in a relatively thick inner cover layer (or mantle) of a solid, three-piece multi-layered golf ball. In another preferred version, one or more patterns of weighting material are incorporated in the ball, and most preferably along the outer periphery of the ball so that the pattern is visible along the ball's exterior. The size and weight of the core is reduced in order to produce an overall golf ball which meets, or is less than, the 1.62 ounce maximum weight limitation specified by the United States Golf Association. It has been found that the present invention produces a golf ball with an increased moment of inertia and/or a greater radius of gyration and thus generates lower spin. The golf ball of the present invention may also utilize an enlarged diameter which serves to further reduce spin rate. The resulting golf ball exhibits properties of reduced spin without sacrificing durability, playability and resilience.

11 Claims, 6 Drawing Sheets

U.S. PATENT DOCUMENTS

| | | | |
|---|---|---|---|
| 922,773 A | 5/1909 | Kempshall | |
| 985,741 A | 2/1911 | Harvey | |
| 1,182,605 A | 5/1916 | Wadsworth | |
| 1,265,036 A | 5/1918 | Bendelow | |
| 1,286,834 A | 12/1918 | Taylor | |
| 1,418,220 A | 5/1922 | White | |
| 1,482,232 A | 1/1924 | Hazeltine | |
| 1,529,708 A | 3/1925 | Morris | |
| 1,656,408 A | 1/1928 | Young | |
| 1,666,699 A | 4/1928 | Hagen | |
| 1,681,167 A | 8/1928 | Beldam | |
| 1,716,435 A | 6/1929 | Fotheringham | |
| 1,795,732 A | 3/1931 | Miller | |
| 1,855,448 A | 4/1932 | Hazeltine | |
| 2,002,726 A | 5/1935 | Young | |
| 2,050,402 A | 8/1936 | Walsh | |
| D107,066 S | 11/1937 | Cavignac | |
| 2,106,704 A | 2/1938 | Davis | |
| 2,643,125 A | 6/1953 | Juve | |
| 2,728,576 A | 12/1955 | Martin et al. | |
| 2,730,159 A | 1/1956 | Semegen | |
| 2,741,480 A | 4/1956 | Smith | |
| 2,861,810 A | 11/1958 | Veatch | |
| 2,997,302 A | 8/1961 | Smith | 473/365 |
| 3,031,194 A | 4/1962 | Strayer | 473/353 |
| RE25,427 E | 7/1963 | Harkins | |
| 3,264,272 A | 8/1966 | Rees | 473/36.9 |
| 3,331,605 A | 7/1967 | Special | 473/353 |
| 3,708,172 A | 1/1973 | Rango | 473/36.9 |
| D228,394 S | 9/1973 | Martin et al. | |
| 3,819,190 A | 6/1974 | Nepela et al. | 473/218 |
| 3,819,768 A | 6/1974 | Molitor | 473/268 |
| 3,865,369 A | 2/1975 | Randolph | 473/383 |
| 3,940,145 A | 2/1976 | Gentiluomo | 473/385 |
| D243,866 S | 3/1977 | Shaw et al. | |
| D247,685 S | 4/1978 | Haines et al. | |
| 4,085,937 A | 4/1978 | Schenk | 473/126 |
| 4,090,716 A | 5/1978 | Martin et al. | 473/327 |
| 4,141,559 A | 2/1979 | Melvin et al. | 473/372 |
| 4,142,727 A | 3/1979 | Shaw et al. | 473/381 |
| 4,201,384 A | 5/1980 | Barber | 473/280 |
| 4,235,441 A | 11/1980 | Ciccarello | 473/267 |
| 4,256,304 A | 3/1981 | Smith et al. | 473/451 |
| 4,258,921 A | 3/1981 | Worst | 473/268 |
| 4,264,071 A | 4/1981 | Randolph | 473/125 |
| 4,266,773 A | 5/1981 | Treadwell | 473/383 |
| 4,274,637 A | 6/1981 | Molitor | 473/356 |
| 4,284,276 A | 8/1981 | Worst | 473/383 |
| 4,346,898 A | 8/1982 | Badke | 473/384 |
| 4,431,193 A | 2/1984 | Nesbitt | 473/374 |
| 4,483,537 A | 11/1984 | Hanada et al. | 473/372 |
| 4,546,980 A | 10/1985 | Gendreau | 473/372 |
| 4,560,168 A | 12/1985 | Aoyama | 473/379 |
| 4,625,964 A | 12/1986 | Yamada | 473/373 |
| 4,650,193 A | 3/1987 | Molitor et al. | 473/373 |
| 4,653,758 A | 3/1987 | Solheim | 473/377 |
| 4,660,834 A | 4/1987 | Carrigan | 473/105 |
| 4,681,323 A | 7/1987 | Alaki et al. | 473/383 |
| 4,714,253 A | 12/1987 | Nakahara et al. | 473/373 |
| 4,720,111 A | 1/1988 | Yamada | 473/382 |
| 4,722,529 A | 2/1988 | Shaw et al. | 473/381 |
| 4,726,590 A | 2/1988 | Molitor | 473/372 |
| 4,729,567 A | 3/1988 | Oka et al. | 473/384 |
| 4,729,861 A | 3/1988 | Lynch et al. | 473/219 |
| 4,744,564 A | 5/1988 | Yamada | 473/379 |
| 4,762,326 A | 8/1988 | Gobush | 473/380 |
| 4,765,626 A | 8/1988 | Gobush | 473/383 |
| 4,770,422 A | 9/1988 | Isaac | 473/372 |
| 4,772,026 A | 9/1988 | Gobush | 473/384 |
| 4,787,638 A | 11/1988 | Kobayashi | 473/384 |
| 4,801,649 A | 1/1989 | Statz | 473/383 |
| 4,804,189 A | 2/1989 | Gobush | 473/384 |
| 4,813,677 A | 3/1989 | Oka et al. | 473/384 |
| 4,830,378 A | 5/1989 | Aoyama | 473/384 |
| 4,840,381 A | 6/1989 | Ihara et al. | 473/365 |
| 4,844,472 A | 7/1989 | Ihara | 473/379 |
| 4,848,766 A | 7/1989 | Oka et al. | 473/384 |
| 4,848,770 A | 7/1989 | Shama | 473/373 |
| 4,852,884 A | 8/1989 | Sullivan | 473/372 |
| 4,858,923 A | 8/1989 | Gobush et al. | 473/365 |
| 4,863,167 A | 9/1989 | Matsuki et al. | 473/373 |
| 4,867,459 A | 9/1989 | Ihara | 473/379 |
| 4,869,512 A | 9/1989 | Nomura et al. | 473/383 |
| 4,877,252 A | 10/1989 | Shaw | 473/379 |
| 4,880,241 A | 11/1989 | Melvin et al. | 473/372 |
| 4,884,814 A | 12/1989 | Sullivan | 473/383 |
| 4,886,277 A | 12/1989 | Mackey | 473/379 |
| 4,915,389 A | 4/1990 | Ihara | 473/383 |
| 4,915,390 A | 4/1990 | Gobush et al. | 473/719 |
| 4,921,255 A | 5/1990 | Taylor | 473/383 |
| 4,925,193 A | 5/1990 | Melvin et al. | 473/378 |
| 4,932,664 A | 6/1990 | Pocklington et al. | 473/384 |
| 4,936,587 A | 6/1990 | Lynch et al. | 473/384 |
| 4,949,976 A | 8/1990 | Gobush | 473/379 |
| 4,960,283 A | 10/1990 | Gobush | 473/784 |
| 4,968,038 A | 11/1990 | Yamada | 473/373 |
| 4,971,330 A | 11/1990 | Morell | 473/384 |
| 4,973,057 A | 11/1990 | Morell | 473/383 |
| 4,974,853 A | 12/1990 | Morell | 473/384 |
| 4,974,854 A | 12/1990 | Morell | 473/384 |
| 4,974,855 A | 12/1990 | Morell | 473/384 |
| 4,974,856 A | 12/1990 | Morell | 473/383 |
| 4,979,747 A | 12/1990 | Jonkouski | 473/379 |
| 4,982,964 A | 1/1991 | Morell | 473/383 |
| 4,986,545 A | 1/1991 | Sullivan | 473/372 |
| 4,991,852 A | 2/1991 | Pattison | 473/379 |
| 4,998,733 A | 3/1991 | Lee | 473/383 |
| 5,000,459 A | 3/1991 | Isaac | 473/356 |
| 5,009,427 A | 4/1991 | Stiefel et al. | 473/379 |
| 5,009,428 A | 4/1991 | Yamagishi et al. | 473/384 |
| 5,016,887 A | 5/1991 | Jonkouski | 473/379 |
| 5,018,741 A | 5/1991 | Stiefel et al. | 473/379 |
| 5,024,444 A | 6/1991 | Yamagishi et al. | 473/384 |
| 5,026,067 A | 6/1991 | Gentiluomo | 473/379 |
| 5,033,750 A | 7/1991 | Yamagishi et al. | 473/384 |
| 5,044,638 A | 9/1991 | Nesbitt et al. | 473/374 |
| 5,046,742 A | 9/1991 | Mackey | 473/384 |
| 5,048,838 A | 9/1991 | Chikaraishi et al. | 473/383 |
| 5,060,953 A | 10/1991 | Bunger et al. | 473/383 |
| 5,060,954 A | 10/1991 | Gobush | 473/374 |
| 5,062,644 A | 11/1991 | Lee | 473/384 |
| 5,064,199 A | 11/1991 | Morell | 473/379 |
| 5,072,945 A | 12/1991 | Oka et al. | 473/384 |
| 5,078,402 A | 1/1992 | Oka | 473/384 |
| 5,080,367 A | 1/1992 | Lynch et al. | 473/384 |
| 5,098,105 A | 3/1992 | Sullivan | 473/372 |
| 5,120,791 A | 6/1992 | Sullivan | 525/196 |
| 5,187,013 A | 2/1993 | Sullivan | 473/409 |
| 5,209,485 A | 5/1993 | Nesbitt et al. | 473/373 |
| 5,215,304 A | 6/1993 | Pinel, Jr. et al. | 473/126 |
| 5,222,739 A | 6/1993 | Horiuchi et al. | 473/356 |
| 5,273,286 A | 12/1993 | Sun | 473/373 |
| 5,273,287 A | 12/1993 | Molitor et al. | 473/384 |
| 5,298,571 A | 3/1994 | Statz et al. | 525/330.2 |
| 5,304,608 A | 4/1994 | Yabuki et al. | 525/274 |
| 5,368,304 A | 11/1994 | Sullivan et al. | 473/377 |
| 5,427,378 A | 6/1995 | Murphy | 428/407 |
| 5,439,227 A | 8/1995 | Egashira et al. | 473/353 |
| 5,482,286 A | 1/1996 | Molitor et al. | 473/373 |
| 5,580,057 A | 12/1996 | Sullivan et al. | 473/379 |
| 5,662,534 A | 9/1997 | Kroll et al. | 473/353 |

| | | | | | |
|---|---|---|---|---|---|
| 5,733,207 A | 3/1998 | Sullivan et al. ............. 473/377 | GB | 645 | of 1914 |
| | FOREIGN PATENT DOCUMENTS | | GB | 189551 | 9/1921 |
| | | | GB | 377354 | 5/1931 |
| GB | 4774 | of 1892 | GB | 420410 | 1/1934 |
| GB | 4360 | of 1898 | GB | 2230531 | 10/1990 |
| GB | 20778 | of 1911 | GB | 2260546 | 5/1996 |
| GB | 3012 | of 1912 | WO | WO 02509 | 11/1980 |
| GB | 22179 | of 1912 | | | |

LOW SPIN GOLF BALL UTILIZING PERIMETER WEIGHTING

CROSS REFERENCES TO RELATED APPLICATIONS

This application is a divisional of application Ser. No. 09/248,627, filed Feb. 11, 1999 (now U.S. Pat. No. 6,261, 193); which is a continuation-in-part of Ser. No. 08/716,016, filed Sep. 19, 1996 (now U.S. Pat. No. 5,820,489) which is a divisional of U.S. application Ser. No. 08/255,442, filed Jun. 8, 1994, now abandoned, which is a continuation of U.S. application Ser. No. 08/054,406, filed Apr. 28, 1993 (now U.S. Pat. No. 5,368,304). Application Ser. No. 09/248, 627 is also a continuation-in-part of U.S. application Ser. No. 09/049,868, filed Mar. 27, 1998 (now U.S. Pat. No. 5,984,806), which is a continuation-in-pan of U.S. application Ser. No. 08/782,221, filed Jan. 13, 1997 (now U.S. Pat. No. 6,015,356), and which claims priority from provisional application Serial No. 60/042,428, filed Mar. 28, 1997.

FIELD OF THE INVENTION

The present invention relates to golf balls and, more particularly, to improved two-piece golf balls having low spin rates. The improvement in the golf balls results from a combination of a relatively soft core and a hard cover made from blends of one or more specific hard, high stiffness ionomers. The combination of a soft core and a hard cover leads to an improved golf ball having a lower than anticipated spin rate while maintaining the resilience and durability characteristics necessary for repetitive play.

The present invention also pertains to improved multi-layer golf balls having one or more layers containing metal particles or other heavy weight filler materials to enhance the perimeter weight of the balls. Such weighting material may be incorporated in one or more of an inner layer or an outer layer of the ball. Preferably, the heavy weight filler particles are present in an outer cover layer. Most preferably, the weighting material is visible along the exterior of the ball. The inclusion of the particles along with the production of a smaller core produces a greater (or higher) moment of inertia. This results in less spin, reduced slicing and hooking and further distance.

In an additional embodiment of the invention, the spin rate is further reduced by decreasing the weight of the soft core while maintaining core size and by increasing the thickness of the cover. The larger, less dense finished ball exhibits lower spin rates after club impact than conventional balls.

BACKGROUND OF THE INVENTION

Spin rate is an important golf ball characteristic for both the skilled and unskilled golfer. High spin rates allow for the more skilled golfer, such as PGA professionals and low handicap players, to maximize control of the golf ball. This is particularly beneficial to the more skilled golfer when hitting an approach shot to a green. The ability to intentionally produce "back spin", thereby stopping the ball quickly on the green, and/or "side spin" to draw or fade the ball, substantially improves the golfer's control over the ball. Thus, the more skilled golfer generally prefers a golf ball exhibiting high spin rate properties.

However, a high spin golf ball is not desirous by all golfers, particularly high handicap players who cannot intentionally control the spin of the ball. In this regard, less skilled golfers, have, among others, two substantial obstacles to improving their game: slicing and hooking. When a club head meets a ball, an unintentional side spin is often imparted which sends the ball off its intended course. The side spin reduces one's control over the ball as well as the distance the ball will travel. As a result, unwanted strokes are added to the game.

Consequently, while the more skilled golfer desires a high spin golf ball, a more efficient ball for the less skilled player is a golf ball that exhibits low spin properties. The low spin ball reduces slicing and hooking and enhances roll distance for the amateur golfer.

The present inventors have addressed the need for developing a golf ball having a reduced spin rate after club impact, while at the same time maintaining durability, playability and resiliency characteristics needed for repeated use. The reduced spin rate golf ball of the present invention meets the rules and regulations established by the United States Golf Association (U.S.G.A.).

Along these lines, the U.S.G.A. has set forth five (5) specific regulations to which a golf ball must conform. The U.S.G.A. rules require that a ball be no smaller than 1.680 inches in diameter. However, notwithstanding this restriction, there is no specific limitation as to the maximum permissible diameter of a golf ball. As a result, a golf ball can be as large as desired so long as it is larger than 1.680 inches in diameter and so long as the other four (4) specific regulations are met.

The U.S.G.A. rules also require that balls weigh no more than 1.620 ounces, and that their initial velocity may not exceed 250 feet per second with a maximum tolerance of 2%, or up to 255 ft./sec. Further, the U.S.G.A. rules state that a ball may not travel a distance greater than 280 yards with a test tolerance of 6% when hit by the U.S.G.A. outdoor driving machine under specific conditions.

It has been determined by the present inventors that the combination of a relatively soft core (i.e. Riehle compression of about 75 to 115) and a hard cover (i.e. Shore D hardness of 65 or more) significantly reduces the overall spin rate of the resulting two piece golf ball. The inventors have also learned that an increase in cover thickness, thereby increasing the overall diameter of the resulting molded golf ball, further reduces spin rate.

Top-grade golf balls sold in the United States may be generally classified as one of two types: two-piece or three-piece balls. The two-piece ball, exemplified by the balls sold by Spalding & Evenflo Companies, Inc. (the assignee of the present invention through its wholly owned subsidiary, Lisco, Inc.) under the trademark TOP-FLITE, consists of a solid polymeric core and a separately formed outer cover. The so-called three-piece balls, exemplified by the balls sold under the trademark TITLEIST by the Acushnet Company, consist of a liquid (e.g., TITLEIST TOUR 384) or solid (e.g., TITLEIST DT) center, elastomeric thread windings about the center, and a cover.

Spalding's two-piece golf balls are produced by molding a natural (balata) or synthetic (i.e. thermoplastic resin such as an ionomer resin) polymeric cover composition around a preformed polybutadiene (rubber) core. During the molding process, the desired dimple pattern is molded into the cover material. In order to reduce the number of coating steps involved in the finishing of the golf balls, a color pigment or dye and, in many instances, an optical brightener, are added directly to the generally "off white" colored polymeric cover composition prior to molding. By incorporating the pigment and/or optical brightener in the cover composition molded onto the golf ball core, this process eliminates the need for a supplemental pigmented painting step in order to produce a white or colored (notably orange, pink and yellow) golf ball.

With respect to multi-layered golf balls, Spalding is the leading manufacturer of two-piece golf balls in the world. Spalding manufactures over sixty (60) different types of two-piece balls which vary distinctly in such properties as playability (i.e. spin rate, compression, feel, etc.), travel distance (initial velocity, C.O.R., etc.), durability (impact, cut and weather resistance) and appearance (i.e. whiteness, reflectance, yellowness, etc.) depending upon the ball's core, cover and coating materials, as well as the ball's surface configuration (i.e. dimple pattern). Consequently, Spalding's two-piece golf balls offer both the amateur and professional golfer a variety of performance characteristics to suit an individual's game.

In regard to the specific components of a golf ball, although the nature of the cover can, in certain instances, make a significant contribution to the overall feel, spin (control), coefficient of restitution (C.O.R.) and initial velocity of a ball (see, for example, U.S. Pat. No. 3,819,768 to Molitor), the initial velocity of two-piece and three-piece balls is determined mainly by the coefficient of restitution of the core. The coefficient of restitution of the core of wound (i.e. three-piece) balls can be controlled within limits by regulating the winding tension and the thread and center composition. With respect to two-piece balls, the coefficient of restitution of the core is a function of the properties of the elastomer composition from which it is made.

The cover component of a golf ball is particularly influential in effecting the compression (feel), spin rates (control), distance (C.O.R.), and durability (i.e. impact resistance, etc.) of the resulting ball. Various cover compositions have been developed by Spalding and others in order to optimize the desired properties of the resulting golf balls.

Over the last twenty (20) years, improvements in cover and core material formulations and changes in dimple patterns have more or less continually improved golf ball distance. Top-grade golf balls, however, must meet several other important design criteria. To successfully compete in today's golf ball market, a golf ball should be resistant to cutting and must be finished well; it should hold a line in putting and should have good click and feel. In addition, the ball should exhibit spin and control properties dictated by the skill and experience of the end user.

A low spin ball is generally preferred, particularly for the less skilled player. And, increasing the moment of inertia of the ball tends to reduce the spin rate of the ball. The present invention provides a remarkable and unique approach for readily increasing the moment of inertia of a golf ball. The approach of the present invention is economical and easily implemented in large scale commercial golf ball manufacturing processes.

In an alternative embodiment, the spin rate of the ball is further reduced by increasing the thickness of the cover and/or decreasing the weight and softness of the core. By increasing the cover thickness and/or the overall diameter of the resulting molded golf ball, enhanced reduction in spin rate is observed.

With respect to the increased size of the ball, over the years golf ball manufacturers have generally produced golf balls at or around the minimum size and maximum weight specifications set forth by the U.S.G.A. There have, however, been exceptions, particularly in connection with the manufacture of golf balls for teaching aids. For example, oversized, overweight (and thus unauthorized) golf balls have been on sale for use as golf teaching aids (see U.S. Pat. No. 3,201,384 to Barber).

Oversized golf balls are also disclosed in New Zealand Patent 192,618 dated Jan. 1, 1980, issued to a predecessor of the present assignee. This patent teaches an oversize golf ball having a diameter between 1.700 and 1.730 inches and an oversized core of resilient material (i.e. about 1.585 to 1.595 inches in diameter) so as to increase the coefficient of restitution. Additionally, the patent discloses that the ball should include a cover having a thickness less than the cover thickness of conventional balls (i.e. a cover thickness of about 0.050 inches as opposed to 0.090 inches for conventional two-piece balls).

In addition, it is also noted that golf balls made by Spalding in 1915 were of a diameter ranging from 1.630 inches to 1.710 inches. As the diameter of the ball increased, the weight of the ball also increased. These balls were comprised of covers made up of balata/gutta percha and cores made from solid rubber or liquid sacs and wound with elastic thread.

Golf balls known as the LYNX JUMBO were also commercially available by Lynx in October, 1979. These balls had a diameter of 1.76 to 1.80 inches. The LYNX JUMBO balls met with little or no commercial success. The LYNX JUMBO balls consisted of a core comprised of wound core and a cover comprised of natural or synthetic balata.

However, notwithstanding the enhanced diameters of these golf balls, none of these balls produced the enhanced spin reduction characteristics and overall playability, distance and durability properties of the present invention and/or fall within the regulations set forth by the U.S.G.A. An object of the present invention is to produce a U.S.G.A. regulation golf ball having improved low spin properties while maintaining the resilience and durability characteristics necessary for repetitive play.

These and other objects and features of the invention will be apparent from the following summary and description of the invention and from the claims.

SUMMARY OF THE INVENTION

The present invention is directed to improved golf balls having a low rate of spin upon club impact. The golf balls comprise a soft core and a hard cover. The core has a Riehle compression of at least about 75, and preferably 75 to about 115. The cover has a Shore D hardness of at least about 65. The golf balls generally comprise a core and an outer layer, the outer layer including at least one discrete region of a weighting material that serves to increase the moment of inertia of the golf ball.

In a first aspect, the present invention provides a golf ball comprising a core having a Riehle compression of at least 75, and a layer disposed about the core that has a Shore D hardness of at least about 65. The layer includes at least one region of weighting material, and at least one other region of layer material less dense than the weighting material.

In another aspect, the present invention provides a golf ball comprising a core having a Riehle compression of at least about 75, and an outer layer disposed around the core. The outer layer includes at least one discrete region of a weighting material that serves to increase the moment of inertia of the ball. And, at least one region of the weighting material is visible along the exterior of the golf ball. The outer layer has a Shore D hardness of at least about 65.

In yet another aspect, the present invention provides a multi-layer golf ball having an increased moment of inertia.

The golf ball comprises a core having a Riehle compression of from about 75 to about 115. The core further comprises an inner layer disposed about the core, and an outer layer disposed about the inner layer. The outer layer has a Shore D hardness of at least about 65. The golf ball further comprises an effective amount of a weighting material disposed in at least one of the inner layer or the outer layer.

Through the use of the softer cores and the hard cover, overall finished balls of the invention exhibit significantly lower spin rates than conventional balls of equal size and weight. Further, reduction in spin is also produced by increasing the thickness of the cover and by decreasing the weight of the softened core.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE PREFERRED EMBODIMENTS

Figure 1:
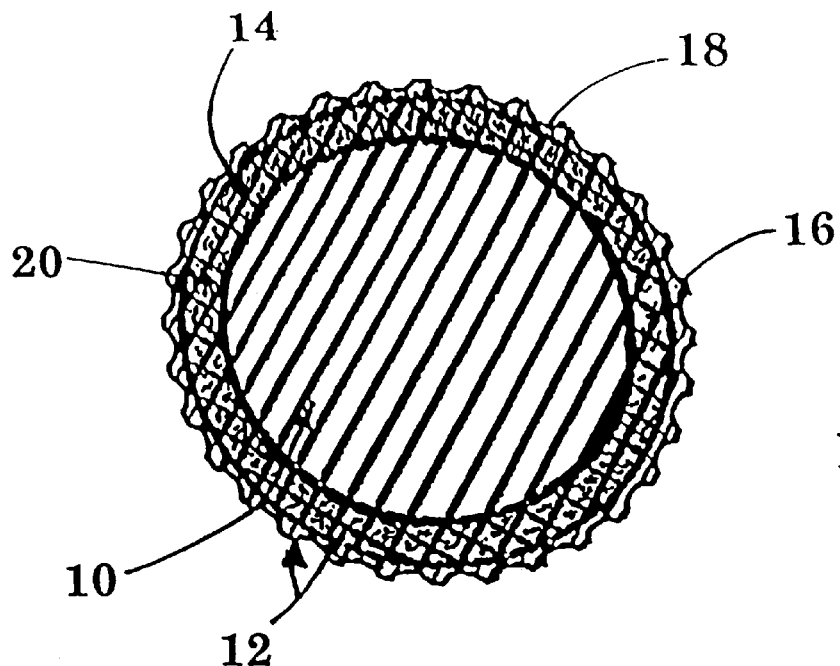
FIG. 1 is a cross-sectional view of a preferred embodiment golf ball embodying the invention illustrating a core 10 and a multi-layer cover 12 consisting of an inner layer 14 containing metal particles or other heavy filler materials 20 and an outer layer 16 having dimples 18.

The present invention relates to the development of a golf ball having a low spin rate as a result of combining a relatively soft core and a hard cover. Such a lower spin rate after club impact contributes to straighter shots when the ball is mis-hit, greater efficiency in flight, and a lesser degree of energy loss on impact with the ground, adding increased roll or distance.

The present invention is also directed to improved multi-layer golf ball compositions and the resulting regulation balls produced using those compositions. In this regard, a smaller and lighter core is produced and metal particles, or other heavy weight filler materials, are included in the cover compositions. This results in a molded golf ball exhibiting enhanced perimeter weighting. Preferably, the particles are included in a relatively thick inner cover layer (or mantle) of a solid, three-piece multi-layered golf ball. In another preferred embodiment, the particles or other weighting material is disposed in an outer layer. Most preferably, the weighting material is viewable or otherwise visible along the ball's exterior. The size and weight of the core is reduced in order to produce an overall golf ball which meets, or is less than, the 1.62 ounce maximum weight limitation specified by the United States Golf Association.

In addition, by increasing the diameter of the overall ball of the present invention beyond the U.S.G.A. minimum of 1.680 inches, the spin rate is still further decreased. In this embodiment of the invention, the ball, even though of larger diameter, uses substantially the same size core as a standard golf ball, the difference in size being provided by the additional thickness in the cover of the ball. This larger, low spin ball produces even greater control and flight efficiency than the standard size ball embodiment of the present invention. Various measurements are referred to herein. These are as follows:

Riehle compression is a measurement of the deformation of a golf ball in thousandths of inches under a fixed static load of 200 pounds (a Riehle compression of 47 corresponds to a deflection under load of 0.047 inches).

PGA compression is determined by a force applied to a spring (i.e. 80 PGA=80 Riehle; 90 PGA=70 Riehle; and 100 PGA=60 Riehle) and manufactured by Atti Engineering, Union City, N.J.

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Shore hardness was measured in accordance with ASTM Test D-2240.

Core

Notwithstanding the overall size differences of the various embodiments of the present invention, the core of the present invention is relatively soft and of similar size. It has a Riehle compression of about 75 or more, preferably about 75 to about 115, and a relatively low PGA compression of about 45 to 85, preferably about 70 to about 80. The resilience of the core is about 0.760 to about 0.780.

The preferred embodiment core used in the present invention is a specially produced softened polybutadiene elastomeric solid core having a conventional diameter of about 1.540 to 1.545 inches. The core is produced from a composition comprising a base elastomer selected from polybutadiene and mixtures of polybutadiene with other elastomers, at least one metallic salt of an unsaturated carboxylic acid (a co-crosslinking agent), and free radical initiator (a co-crosslinking agent). In addition, a suitable and compatible modifying ingredient including, but not limited to metal activators, fatty acids, fillers, polypropylene powder and other additives may be included.

Of particular concern, only a limited amount of the metallic salt of an unsaturated carboxylic acid is included in the core compositions in order to produce the degree of core softness and weight desired. In this regard, it is understood that when a larger overall ball is desired, the composition of the core is adjusted so that the molded finished ball falls within the weight parameters set forth by the U.S.G.A. Since the finished golf balls must still meet the U.S.G.A. weight limitation of 1.620 ounces, the core component of the larger and thicker covered balls are designed to be not only softer, but also lighter in weight.

In such circumstances, the specific gravity of the core is less than that of a standard core since the larger ball must weigh the same as a standard ball. The core generally weighs about 36 to 37 grams for a standard sized finished ball and about 33 to 34 grams for an oversized finished ball.

The core (preferably a solid core) is about 1.28 inches to 1.570 inches in diameter, preferably about 1.37 to about 1.54 inches, and most preferably 1.42 inches. The cores weigh about 18 to 39 grams, desirably 25 to 30, and most preferably 29.7–29.8 grams.

The solid cores are typically compression molded from a slug of uncured or lightly cured elastomer composition comprising a high cis content polybutadiene and a metal salt of an a, p, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, lesser amounts of metal oxide can be included in order to lighten the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

It will be understood that a wide array of other core configurations and materials could be utilized in conjunction with the present invention. For example, cores disclosed in U.S. Pat. Nos. 5,645,597; 5,480,155; 5,387,637; 5,150,906; 5,588,924; 5,507,493; 5,503,397; 5,482,286; 5,018,740; 4,852,884; 4,844,471; 4,838,556; 4,726,590; and 4,650,193; all of which are hereby incorporated by reference, may be utilized in whole or in part.

The specially produced core compositions and resulting molded cores of the present invention are manufactured using relatively conventional techniques. In this regard, the core compositions of the invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized. Most preferably, cis-polybutadiene having a weight-average molecular weight of from about 100,000 to about 500,000 is employed. Along this line, it has been found that the high cis-polybutadiene manufactured and sold by Shell Chemical Co., Houston, Tex., under the tradename Cariflex BR-1220, and the polyisoprene available from Muehlstein, H & Co., Greenwich, Conn. under the designation "SKI 35" are particularly well suited.

The unsaturated carboxylic acid component of the core composition (a co-crosslinking agent) is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 25, and preferably from about 17 to about 21 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercially available peroxides are Luperco 230 or 231 XL sold by Atochem, Lucidol Division, Buffalo, N.Y., and Trigonox 17/40 or 29/40 sold by Akzo Chemie America, Chicago, Ill. In this regard Luperco 230 XL and Trigonox 17/40 are comprised of n-butyl 4,4-bis (butylperoxy) valerate; and, Luperco 231 XL and Trigonox 29/40 are comprised of 1,1-bis(t-butylperoxy)-3,3,5-trimethyl cyclohexane. The one hour half life of Luperco 231 XL and Trigonox 29/40 is about 112° C., and the one hour half life of Luperco 230 XL and Trigonox 17/40 is about 129° C.

The core compositions of the present invention may additionally contain any other suitable and compatible modifying ingredients including, but not limited to, metal oxides, fatty acids, and diisocyanates and polypropylene powder resin. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger. In addition, it has been found that the addition of a polypropylene powder resin results in a core which is too hard (i.e. exhibits low compression) and thus allows for a reduction in the amount of crosslinking agent utilized to soften the core to a normal or below normal compression.

Furthermore, because polypropylene powder resin can be added to core composition without an increase in weight of the molded core upon curing, the addition of the polypropylene powder allows for the addition of higher specific gravity fillers, such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". Generally, from 0 to about 25 parts by weight polypropylene powder per each 100 parts of elastomer are included in the present invention.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

Moreover, filler-reinforcement agents may be added to the composition of the present invention. Since the specific gravity of polypropylene powder is very low, and when compounded, the polypropylene powder produces a lighter molded core, when polypropylene is incorporated in the core compositions, relatively large amounts of higher gravity fillers may be added so long as the specific core weight limitations are met. Additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces. Exemplary fillers include mineral fillers such as limestone, silica, mica, barytes, calcium carbonate, or clays. Limestone is ground calcium/magnesium carbonate and is used because it is an inexpensive, heavy filler.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 2 to about 15 parts by weight based on 100 parts rubber (elastomer).

It is preferred that the core compositions include stearic acid as the fatty acid adjunct in an amount of from about 2 to about 5 parts by weight per 100 parts of rubber. Metallic salts of fatty acids such as zinc stearate may also be used as an activator from 2 to 20 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates know to the art.

Furthermore, the dialkyl tin difatty acids set forth in U.S. Pat. No. 4,844,471, the dispersing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The core compositions of the invention are generally comprised of 100 parts by weight of a base elastomer (or rubber) selected from polybutadiene and mixtures of polybutadiene with other elastomers, 15 to 25 parts by weight of at least one metallic salt of an unsaturated carboxylic acid, and 1 to 10 parts by weight of a free radical initiator.

As indicated above, additional suitable and compatible modifying agents such as particulate polypropylene resin, fatty acids, and secondary additives such as Pecan shell flour, ground flash (i.e. grindings from previously manufactured cores of substantially identical construction), barium sulfate, zinc oxide, etc. may be added to the core compositions to adjust the weight of the ball as necessary in order to have the finished molded ball (core, cover and coatings) to closely approach the U.S.G.A. weight limit of 1.620 ounces.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer, polypropylene powder resin (if desired), fillers, zinc salt, metal oxide, fatty acid, and the metallic dithiocarbamate (if desired), surfactant (if desired), and tin difatty acid (if desired), are blended for about 7 minutes in an internal mixer such as a Banbury mixer. As a result of shear during mixing, the temperature rises to about 200° F. The initiator and diisocyanate are then added and the mixing continued until the temperature reaches about 220° F. where-upon the batch is discharged onto a two roll mill, mixed for about one minute and sheeted out.

The sheet is rolled into a "pig" and then placed in a Barwell preformer and slugs are produced. The slugs are then subjected to compression molding at about 320° F. for about 14 minutes. After molding, the molded cores are cooled, the cooling effected at room temperature for about 4 hours or in cold water for about one hour. The molded cores are subjected to a centerless grinding operation whereby a thin layer of the molded core is removed to produce a round core having a diameter of 1.540 to 1.545 inches. Alternatively, the cores are used in the as-molded state with no grinding needed to achieve roundness.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

The core is converted into a golf ball by providing at least one layer of covering material thereon, ranging in thickness from about 0.070 to about 0.130 inches and preferably from about 0.0675 to about 0.1275 inches.

Cover and Weighting Material

The cover is preferably comprised of a hard, high-stiffness ionomer resin, most preferably a metal cation neutralized high acid ionomer resin containing more than 16% carboxylic acid by weight, or blend thereof. The cover has a Shore D hardness of about 65 or greater.

With respect to the ionomeric cover composition of the invention, ionomeric resins are polymers containing interchain ionic bonding. As a result of their toughness, durability, and flight characteristics, various ionomeric resins sold by E.I. DuPont de Nemours & Company under the trademark "Surlyn®" and more recently, by the Exxon Corporation (see U.S. Pat. No. 4,911,451) under the trademark "Escor®" and the tradename "Iotek", have become the materials of choice for the construction of golf ball covers over the traditional "balata" (trans-polyisoprene, natural or synthetic) rubbers.

Ionomeric resins are generally ionic copolymers of an olefin, such as ethylene, and a metal salt of an unsaturated carboxylic acid, such as acrylic acid, methacrylic acid or maleic acid. In some instances, an additional softening comonomer such as an acrylate can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, etc. are used to neutralize some portion of the acid groups in the copolymer resulting in a thermoplastic elastomer exhibiting enhanced properties, i.e., improved durability, etc. for golf ball construction over balata.

The ionomeric resins utilized to produce cover compositions can be formulated according to known procedures such as those set forth in U.S. Pat. No. 3,421,766 or British Patent No. 963,380, with neutralization effected according to procedures disclosed in Canadian Patent Nos. 674,595 and 713,631, wherein the ionomer is produced by copolymerizing the olefin and carboxylic acid to produce a copolymer having the acid units randomly distributed along the polymer chain. Broadly, the ionic copolymer generally comprises one or more α-olefins and from about 9 to about 20 weight percent of α, β-ethylenically unsaturated mono- or dicarboxylic acid, the basic copolymer neutralized with metal ions to the extent desired.

At least about 20% of the carboxylic acid groups of the copolymer are neutralized by the metal ions (such as sodium, potassium, zinc, calcium, magnesium, and the like) and exist in the ionic state. Suitable olefins for use in preparing the ionomeric resins include ethylene, propylene, butene-l, hexene-1 and the like. Unsaturated carboxylic acids include acrylic, methacrylic, ethacrylic, α-chloroacrylic, crotonic, maleic, fumaric, itaconic acids, and the like. The ionomeric resins utilized in the golf ball industry are generally copolymers of ethylene with acrylic (i.e., Escor®) and/or methacrylic (i.e., Surlyn®) acid. In addition, two or more types of ionomeric resins may be blended in to the cover compositions in order to produce the desired properties of the resulting golf balls.

The cover compositions which may be used in making the golf balls of the present invention are set forth in detail but not limited to those in copending U.S. Ser. No. 07/776,803 filed Oct. 15, 1991, and Ser. No. 07/901,660 filed Jun. 19, 1992, both incorporated herein by reference. In short, the cover material is comprised of hard, high stiffness ionomer resins, preferably containing relatively high amounts of acid (i.e., greater than 16 weight percent acid, preferably from about 17 to about 25 weight percent acid, and more preferably from about 18.5 to about 21.5 weight percent) and at least partially neutralized with metal ions (such as sodium, zinc, potassium, calcium, magnesium and the like). The high acid resins are blended and melt processed to produce compositions exhibiting enhanced hardness and coefficient of restitution values when compared to low acid ionomers, or blends of low acid ionomer resins containing 16 weight percent acid or less.

The preferred cover compositions are made from specific blends of two or more high acid ionomers with other cover additives which do not exhibit the processing, playability, distance and/or durability limitations demonstrated by the prior art. However, as more particularly indicated below, the cover composition can also be comprised of one or more low acid ionomers so long as the molded covers exhibit a hardness of 65 or more on the Shore D scale.

The cover composition may include a hard, high stiffness preferably high acid ionomer such as that sold by E.I. DuPont de Nemours & Company under the trademark "Surlyn®" and by Exxon Corporation under the trademark "Escor®" or tradename "Iotek", or blends thereof. In addition to the Surlyn® and Escor® or Iotek ionomers, the cover may comprise any ionomer which either alone or in combination with other ionomers produces a molded cover having a Shore D hardness of at least 65. These include lithium ionomers or blends of ionomers with harder non-ionic polymers such as nylon, polyphenylene oxide and other compatible thermoplastics. As briefly mentioned above, examples of cover compositions which may be used are set forth in detail in copending U.S. Ser. No. 07/776,803 filed Oct. 15, 1991, and Ser. No. 07/901,660 filed Jun. 19, 1992, both incorporated herein by reference. Of course, the cover compositions are not limited in any way to those compositions set forth in said copending applications.

The preferred cover configuration is a multi-layer cover. Metal particles and other heavy weight filler materials, rom about 1 to about 100 parts per hundred parts resin (phr), preferably from about 4 to about 51 phr, and most preferably from about 10 to about 25 phr, are included in the first or inner cover layer in order to enhance the moment of inertia of the golf ball. Such heavy weight filler materials may also be provided in the outer cover layer in these proportions. The multi-layer golf balls of the invention can be of standard or enlarged size.

More preferably, the inner layer or ply of the golf ball of the invention comprises a blend of one or more polymeric materials described herein. Various amounts of metallic particles or other heavy weight filler materials are included in the inner cover layer and the size and weight of the core is reduced in order to produce selective variations in the moment of inertia of the ball. The outer cover layer preferably includes a blend of high acid ionomer resins (greater than 16 weight percent acid) or a blend of high modulus low acid ionomers and has a Shore D hardness of 65 or greater.

In this regard, it has been found that multi-layer golf balls can be produced having inner and outer cover layers which exhibit improved C.O.R. values and have greater travel distance in comparison with balls made from a single cover layer.

As noted, the travel distance of such multi-layer golf balls can be further improved without substantially sacrificing the feel and durability characteristics of the ball through the inclusion of metal particles or other heavy metal filler materials in the inner cover compositions. The metal particles or fragments increase the weight of the interior perimeter of a golf ball in comparison to the central core. Further, the core is also made smaller and lighter in order to conform with the weight requirements of the U.S.G.A. This combination of weight displacement increases the moment of inertia and/or moves the radius of gyration of the ball closer to the outer surface of the ball.

Consequently, selective adjustments in weight arrangement will produce different moments of inertia and/or radii of gyration. The overall result is the production of a lower initial spinning multi-layer golf ball which travels farther while maintaining the feel and durability characteristics desired by a golf ball utilized in regulation play.

The moment of inertia of a golf ball (also known as rotational inertia) is the sum of the products formed by multiplying the mass (or sometimes the area) of each element of a figure by the square of its distance from a specified line such as the center of a golf ball. This property is directly related to the radius of gyration of a golf ball which is the square root of the ratio of the moment of inertia of a golf ball about a given axis to its mass. It has been found that the greater the moment of inertia (or the farther the radius of gyration is to the center of the ball) the lower the spin rate is of the ball.

The present invention is directed, in part, to increasing the moment of inertia of a multi-layered golf ball by varying the weight arrangement of one or more of the cover, the inner layer, and the core components. By varying the weight, size and density of the components of the golf ball, the moment of inertia of a golf ball can be increased. Such a change can occur in a multi-layered golf ball, including a ball containing one or more cover layers, to enhance distance due to the production of less side spin and improved roll.

Accordingly, the present invention is directed to an improved multi-layer cover which produces, upon molding each layer around a core (preferably a smaller and lighter solid core) to formulate a multi-layer cover, a golf ball exhibiting enhanced distance (i.e., improved resilience, less side spin, improved roll) without adversely affecting, and in many instances, improving the ball's feel (hardness/softness) and/or durability (i.e., cut resistance, fatigue resistance, etc.) characteristics.

Figure 2:
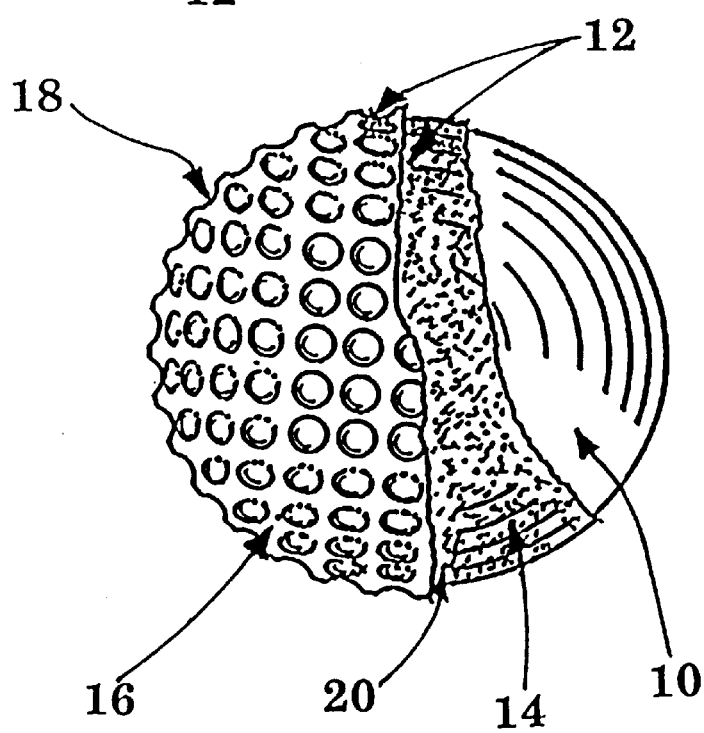
FIG. 2 is a diametrical cross-sectional view of a preferred embodiment golf ball of the invention having a core 10 and a cover 12 made of an inner layer 14 containing metal particles or other fragments 20 and an outer layer 16 having dimples 18.

Referring to FIGS. 1 and 2, a preferred embodiment golf ball in accordance with the present invention is illustrated. This preferred embodiment golf ball comprises a multi-layered cover 12 disposed over a core 10, and method for making same. Preferably the core 10 is a solid core, although a wound core having the desired characteristics can also be used.

The multi-layered cover 12 comprises two layers: a first or inner layer or ply 14 and a second or outer layer or ply 16. The inner layer 14 is comprised of one or more polymeric materials, such as conventional cover materials.

With respect to the inner layer 14 of the preferred embodiment multi-layered cover of the present invention, the inner cover layer is comparatively softer than the outer layer 16. The inner layer or ply is preferably comprised of a relatively soft, low modulus (about 1,000 psi to about 10,000 psi) and low acid (less than 16 weight percent acid) ionomer, ionomer blend or a non-ionomeric elastomer such as, but not limited to, a polyurethane, a polyester elastomer such as that marketed by DuPont under the trademark Hytrel®, a polyurethane sold by BASF under the designation Baytec® or a polyester amide such as that marketed by Elf Atochem S.A. under the trademark Pebax®. The outer layer is fairly thin (i.e. from about 0.010 to about 0.110 in thickness, more desirably 0.03 to 0.06 inches in thickness for a 1.680 inch ball and 0.04 to 0.07 inches in thickness for a 1.72 inch ball), but thick enough to achieve desired playability characteristics while minimizing expense.

Preferably, the inner layer includes a blend of hard and soft (low acid) ionomer resins such as those described in U.S. Pat. Nos. 4,884,814 and 5,120,791, both incorporated herein by reference. Specifically, a desirable material for use in molding the inner layer comprises a blend of a high modulus (hard), low acid, ionomer with a low modulus (soft), low acid, ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

A low modulus ionomer suitable for use in the inner layer blend has a flexural modulus measuring from about 1,000 to about 10,000 psi, with a hardness of about 20 to about 40 on the Shore D scale.

The hard ionomer resins utilized to produce the inner cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the inner cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

The outer layer 16 is comprised of a hard material. Preferably, the outer layer is comprised of a blend of two or more ionomer resins neutralized to various extents by different metal cations. The outer cover layer may or may not include a metal stearate (e.g., zinc stearate) or other metal fatty acid salt. The purpose of the metal stearate or other metal fatty acid salt is to lower the cost of production without affecting the overall performance of the finished golf ball.

The outer layer compositions include the high acid ionomers such as those recently developed by E. I. DuPont de Nemours & Company under the trademark "Surlyn®" and by Exxon Corporation under the trademark "Escor®" or trade name "Iotek", or blends thereof. Examples of compositions which may be used as the inner layer herein are set forth in detail in copending U.S. Ser. No. 07/776,803 filed Oct. 15, 1991, and Ser. No. 07/901,660 filed Jun. 19, 1992, both incorporated herein by reference. Of course, the outer layer high acid ionomer compositions are not limited in any way to those compositions set forth in said copending applications. For example, the high acid ionomer resins recently developed by Spalding & Evenflo Companies, Inc., the assignee of the present invention, and disclosed in U.S. Ser. No. 07/901,680, filed Jun. 19, 1992, incorporated herein by reference, may also be utilized to produce the outer layer of the multi-layer cover used in the present invention.

The high acid ionomers suitable for use in the present invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the high acid ionomer resins included in the cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the cover composition preferably includes a high acid ionomeric resin and the scope of the patent embraces all known high acid ionomeric resins falling within the parameters set forth above, only a relatively limited number of these high acid ionomeric resins are currently available. In this regard, the high acid ionomeric resins available from E.I. DuPont de Nemours Company under the trademark "Surlyn®", and the high acid ionomer resins available from Exxon Corporation under the trademark "Escor®" or tradename "Iotek" are examples of available high acid ionomeric resins which may be utilized in the present invention.

The high acid ionomeric resins available from Exxon under the designation "Escor®" and or "Iotek", are somewhat similar to the high acid ionomeric resins available under the "Surlyn®" trademark. However, since the Escor®/Iotek ionomeric resins are sodium or zinc salts of poly (ethylene acrylic acid) and the "Surlyn®" resins are zinc, sodium, magnesium, etc. salts of poly(ethylene methacrylic acid), distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® AD-8422 offers the following general properties when compared to Surlyn® 8920 the stiffest, hardest of all on the low acid grades (referred to as "hard" ionomers in U.S. Pat. No. 4,884,814) as set forth below in Table 1:

TABLE 1

| | LOW ACID (15 wt % Acid) | HIGH ACID (>20 wt % Acid) | |
|---|---|---|---|
| | SURLYN® 8920 | SURLYN® 8422-2 | SURLYN® 8422-3 |
| IONOMER | | | |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP$^1$, ° C. | 88 | 86 | 85 |
| FP, ° C. | 47 | 48.5 | 45 |
| COMPRESSION MOLDING$^2$ | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

$^1$DSC second heat, 10° C./min heating rate.
$^2$Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn SEP-503-1 and SEP-503-2 ionomers can be defined as follows in Table 2:

TABLE 2

| Surlyn ® Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Examples of the high acid acrylic acid based ionomers suitable for use in the present invention include the Escor® or Iotek high acid ethylene acrylic acid ionomers produced by Exxon. In this regard, Escor® or Iotek 959 is a sodium ion neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows, and shown in Table 3:

TABLE 3

| PROPERTY | ESCOR ® (IOTEK) 959 | ESCOR ® (IOTEK) 960 |
|---|---|---|
| Melt Index, g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Additional high acid hard ionomer resins are also available from Exxon such as Iotek 1002 and Iotek 1003. Iotek 1002 is a sodium ion neutralized high acid ionomer (i.e., 18% by weight acid) and Iotek 1003 is a zinc ion neutralized high acid ionomer (i.e., 18% by weight acid). The properties of these ionomers are set forth below in Table 4:

TABLE 4

| Property | Unit | Value | Method |
|---|---|---|---|
| IOTEK 1002 | | | |
| General properties | | | |
| Melt index | g/10 min | 1.6 | ASTM-D 1238 |
| Density | kg/m$^3$ | | ASTM-D 1505 |
| Cation type | | Na | |
| Melting point | ° C. | 83.7 | ASTM-D 3417 |
| Crystallization point | ° C. | 43.2 | ASTM-D 3417 |
| Plaque properties | | | |
| Tensile at break | MPa | 31.7 | ASTM-D 638 |
| Tensile at yield | MPa | 22.5 | ASTM-D 638 |
| Elongation at break | | 348 | ASTM-D 638 |

TABLE 4-continued

| Property | Unit | Value | Method |
|---|---|---|---|
| 1% Secant modulus | MPa | 418 | ASTM-D 638 |
| 1% Flexural modulus | MPa | 380 | ASTM-D 790 |
| Hardness Shore D | | 62 | ASTM-D 2240 |
| Vicat softening point | ° C. | 51.5 | ASTM-D 1525 |
| IOTEK 1003 | | | |
| General properties | | | |
| Melt index | g/10 min | 1.1 | ASTM-D 1238 |
| Density | kg/m$^3$ | | ASTM-D 1505 |
| Cation type | | Zn | EXXON |
| Melting point | ° C. | 82 | ASTM-D 3417 |
| Crystallization point | ° C. | 51.5 | ASTM-D 3417 |
| Plaque properties | | | |
| Tensile at break | MPa | 24.8 | ASTM-D 638 |
| Tensile at yield | MPa | 14.8 | ASTM-D 638 |
| Elongation at break | % | 387 | ASTM-D 638 |
| 1% Secant modulus | MPa | 145 | ASTM-D 638 |
| 1% Flexural modulus | MPa | 147 | ASTM-D 790 |
| Hardness Shore D | | 54 | ASTM-D 2240 |
| Vicat softening point | ° C. | 56 | ASTM-D 1525 |

Furthermore, as a result of the development by the inventors of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce cover compositions exhibiting enhanced hardness and resilience due to synergies which occur during processing. Consequently, the metal cation neutralized high acid ionomer resins recently produced can be blended to produce substantially harder covered golf balls having higher C.O.R.'s than those produced by the low acid ionomer covers presently commercially available.

More particularly, several new metal cation neutralized high acid ionomer resins have been produced by the inventors by neutralizing, to various extents, high acid copolymers of an alpha-olefin and an alpha, beta-unsaturated carboxylic acid with a wide variety of different metal cation salts. This discovery is the subject matter of U.S. application Ser. No. 901,680, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, methacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 5.

potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 2000 F to about 5000 F, preferably from about 2500 F to about 3500 F under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 6, more specifically in Example 1 in U.S. application Ser. No. 901,680, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc,

TABLE 5

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM |  | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C..

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and magnesium, manganese, calcium and nickel, several new cation neutralized acrylic acid based high acid ionomer resins are produced.

TABLE 6

| Formulation No. | Wt-% Cation Salt | Wt-% Neutralization | Melt Index | C.O.R. | Shore D Hardness |
|---|---|---|---|---|---|
| 1 (NaOH) | 6.98 | 67.5 | 0.9 | .804 | 71 |
| 2 (NaOH) | 5.66 | 54.0 | 2.4 | .808 | 73 |
| 3 (NaOH) | 3.84 | 35.9 | 12.2 | .812 | 69 |
| 4 (NaOH) | 2.91 | 27.0 | 17.5 | .812 | (brittle) |
| 5 (MnAc) | 19.6 | 71.7 | 7.5 | .809 | 73 |
| 6 (MnAc) | 23.1 | 88.3 | 3.5 | .814 | 77 |
| 7 (MnAc) | 15.3 | 53.0 | 7.5 | .810 | 72 |
| 8 (MnAc) | 26.5 | 106 | 0.7 | .813 | (brittle) |
| 9 (LiOH) | 4.54 | 71.3 | 0.6 | .810 | 74 |
| 10 (LiOH) | 3.38 | 52.5 | 4.2 | .818 | 72 |

TABLE 6-continued

| | | | | | |
|---|---|---|---|---|---|
| 11 (LiOH) | 2.34 | 35.9 | 18.6 | .815 | 72 |
| 12 (KOH) | 5.30 | 36.0 | 19.3 | Broke | 70 |
| 13 (KOH) | 8.26 | 57.9 | 7.18 | .804 | 70 |
| 14 (KOH) | 10.7 | 77.0 | 4.3 | .801 | 67 |
| 15 (ZnAc) | 17.9 | 71.5 | 0.2 | .806 | 71 |
| 16 (ZnAc) | 13.9 | 53.0 | 0.9 | .797 | 69 |
| 17 (ZnAc) | 9.91 | 36.1 | 3.4 | .793 | 67 |
| 18 (MgAc) | 17.4 | 70.7 | 2.8 | .814 | 74 |
| 19 (MgAc) | 20.6 | 87.1 | 1.5 | .815 | 76 |
| 20 (MgAc) | 13.8 | 53.8 | 4.1 | .814 | 74 |
| 21 (CaAc) | 13.2 | 69.2 | 1.1 | .813 | 74 |
| 22 (CaAc) | 7.12 | 34.9 | 10.1 | .808 | 70 |

Controls:
50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness

| Formulation No. | Wt-% Cation Salt | Wt-% Neutralization | Melt Index | C.O.R. |
|---|---|---|---|---|
| 23 (MgO) | 2.91 | 53.5 | 2.5 | .813 |
| 24 (MgO) | 3.85 | 71.5 | 2.8 | .808 |
| 25 (MgO) | 4.76 | 89.3 | 1.1 | .809 |
| 26 (MgO) | 1.96 | 35.7 | 7.5 | .815 |

Control for Formulations 23–26 is 50/50 Iotek 8000/7030,
C.O.R. = .814, Formulation 26 C.O.R. was normalized to that control accordingly

| Formulation No. | Wt-% Cation Salt | Wt-% Neutralization | Melt Index | C.O.R. | Shore D Hardness |
|---|---|---|---|---|---|
| 27 (NiAc) | 13.04 | 61.1 | 0.2 | .802 | 71 |
| 28 (NiAc) | 10.71 | 48.9 | 0.5 | .799 | 72 |
| 29 (NiAc) | 8.26 | 36.7 | 1.8 | .796 | 69 |
| 30 (NiAc) | 5.66 | 24.4 | 7.5 | .786 | 64 |

Control for Formulation Nos. 27–30 is 50/50 Iotek 8000/7030,
C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field golf ball manufacturing.

When utilized in golf ball cover construction, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451, and the recently produced high acid blends disclosed in U.S. application Ser. No. 776,803. Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for golf ball production. By using these high acid ionomer resins harder, stiffer golf balls having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e., the outer cover layer herein) the resulting golf balls will travel farther than previously known multi-layered golf balls produced with low acid ionomer resin covers due to the balls' enhanced coefficient of restitution values.

The low acid ionomers which may be suitable for use in formulating the outer layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- of n-butylacrylate, etc.) can also be included to produce a softer terpolymer. The carboxylic acid groups of the copolymer are partially neutralized (i.e., approximately 10–75%, preferably 30–70%) by the metal ions. Each of the low acid ionomer resins which may be included in the outer layer cover compositions of the invention contains 16% by weight or less of a carboxylic acid.

Examples of commercially available hard ionomeric resins which may be used in the present invention in formulating the inner and outer cover blends include the hard sodium ionic copolymer sold under the trademark Surlyn®8940 and the hard zinc ionic copolymer sold under the trademark Surlyn®9910. Surlyn®8940 is a copolymer of ethylene with methacrylic acid and about 15 weight percent acid which is about 29 percent neutralized with sodium ions. This resin has an average melt flow index of about 2.8. Surlyn®9910 is a copolymer of ethylene and methacrylic acid with about 15 weight percent acid which is about 58 percent neutralized with zinc ions. The average melt flow index of Surlyn®9910 is about 0.7. The typical properties of Surlyn®9910 and 8940 are set forth below in Table 7:

TABLE 7

Typical Properties of Commercially Available Hard Surlyn ® Resins Suitable for Use in the Inner and Outer Layer Blends of the Present Invention

| | ASTM D | 8940 | 9910 | 8920 | 8528 | 9970 | 9730 |
|---|---|---|---|---|---|---|---|
| Cation Type | | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm³ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |

TABLE 7-continued

Typical Properties of Commercially Available Hard Surlyn ® Resins Suitable for Use in the Inner and Outer Layer Blends of the Present Invention

|  | ASTM D | 8940 | 9910 | 8920 | 8528 | 9970 | 9730 |
|---|---|---|---|---|---|---|---|
| Elongation, % | D-638 | 470 | 290 | 350 | 450 | 460 | 460 |
| Flexural Modulus (kpsi) MPa | D-790 | (51) 350 | (48) 330 | (55) 380 | (32) 220 | (28) 190 | (30) 210 |
| Tensile Impact (23° C.) KJ/m₂ (ft.-lbs./in²) | D-1822S | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

As will be further noted in the Examples below, other ionomer resins may be used in the cover compositions, such as low acid ionomer resins, so long as the molded cover produces a Shore D hardness of 65 or more. Properties of some of these low acid ionomer resins are provided in the following Table 8:

TABLE 8

Typical Properties of Low Acid Escor ® (Iotek) Ionomers

|  | ASTM Method | Units | 4000 | 4010 | 8000 | 8020 |
|---|---|---|---|---|---|---|
| Resin Properties |  |  |  |  |  |  |
| Cation type |  |  | zinc | zinc | sodium | sodium |
| Melt index | D-1238 | g/10 min. | 2.5 | 1.5 | 0.8 | 1.6 |
| Density | D-1505 | kg/m³ | 963 | 963 | 954 | 960 |
| Melting Point | D-3417 | ° C. | 90 | 90 | 90 | 87.5 |
| Crystallization Point | D-3417 | ° C. | 62 | 64 | 56 | 53 |
| Vicat Softening Point | D-1525 | ° C. | 62 | 63 | 61 | 64 |
| % Weight Acrylic Acid |  |  | 16 | — | 11 | — |
| % of Acid Groups Cation Neutralized |  |  | 30 | — | 40 | — |
| Plaque Properties |  |  |  |  |  |  |
| (3 mm thick, compression molded) |  |  |  |  |  |  |
| Tensile at Break | D-638 | MPa | 24 | 26 | 36 | 31.5 |
| Yield point | D-638 | MPa | none | none | 21 | 21 |
| Elongation at break | D-638 | % | 395 | 420 | 350 | 410 |
| 1% Secant modulus | D-638 | MPa | 160 | 160 | 300 | 350 |
| Shore Hardness D | D-2240 | — | 55 | 55 | 61 | 58 |

|  | ASTM Method | Units | 8030 | 7010 | 7020 | 7030 |
|---|---|---|---|---|---|---|
| Resin Properties |  |  |  |  |  |  |
| Cation type |  |  | sodium | zinc | zinc | zinc |
| Melt Index | D-1238 | g/10 min. | 2.8 | 0.8 | 1.5 | 2.5 |
| Density | D-1505 | kg/m³ | 960 | 960 | 960 | 960 |
| Melting Point | D-3417 | ° C. | 87.5 | 90 | 90 | 90 |
| Crystallization Point | D-3417 | ° C. | 55 | — | — | — |
| Vicat Softening Point | D-1525 | ° C. | 67 | 60 | 63 | 62.5 |
| % Weight Acrylic Acid |  |  | — | — | — | — |
| % of Acid Groups Cation Neutralized |  |  | — | — | — | — |
| Plaque Properties |  |  |  |  |  |  |
| (3 mm thick, compression molded) |  |  |  |  |  |  |
| Tensile at Break | D-638 | MPa | 28 | 38 | 38 | 38 |
| Yield Point | D-638 | MPa | 23 | none | 23 | none |
| Elongation at Break | D-638 | % | 395 | 500 | 420 | 395 |
| 1% Secant modulus | D-638 | MPa | 390 | — | — | — |
| Shore Hardness D | D-2240 | — | 59 | 57 | 55 | 55 |

Comparatively, soft ionomers are used in formulating the hard/soft blends of the inner and outer cover compositions. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer in an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the inner and outer layers of multi-layer balls produced by other known hard-soft ionomer blends as a result of the lower overall raw materials costs and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon and set forth in Table 9:

TABLE 9

Physical Properties of Iotek 7520

| Property Value | ASTM Method | Units | Typical |
|---|---|---|---|
| Melt Index | D-1238 | g/10 min. | 2 |
| Density | D-1505 | g/cc | 0.962 |
| Cation | | | Zinc |
| Melting Point | D-3417 | ° C. | 66 |
| Crystallization Point | D-3417 | ° C. | 49 |
| Vicat Softening Point | D-1525 | ° C. | 42 |
| Plaque Properties | | | |
| (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebound | ISO 4862 | % | 52 |
| De Mattia Flex Resistance | D-430 | Cycles | >5000 |

In addition, test data collected by the inventor indicates that Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, the inventors have found that a newly developed grade of an acrylic acid based soft ionomer available from the Exxon Corporation under the designation Iotek 7510, is also effective, when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn 8625 and the Surlyn 8629 combinations disclosed in U.S. Pat. No. 4,884,814).

In addition, Iotek 7510, when compared to Iotek 7520, produces slightly higher C.O.R. valves at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 are set forth below in Table 10:

TABLE 10

Physical Properties of Iotek 7510 in Comparison to Iotek 7520

| | IOTEK 7520 | IOTEK 7510 |
|---|---|---|
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

It has been determined that when hard/soft ionomer blends are used for the outer cover layer, good results are achieved when the relative combination is in a range of about 90 to about 10 percent hard ionomer and about 10 to about 90 percent soft ionomer. The results are improved by adjusting the range to about 75 to 25 percent hard ionomer and 25 to 75 percent soft ionomer. Even better results are noted at relative ranges of about 60 to 90 percent hard ionomer resin and about 40 to 60 percent soft ionomer resin.

Specific formulations which may be used in the cover composition are included in the examples set forth in U.S. Pat. Nos. 5,120,791 and 4,884,814. The present invention is in no way limited to those examples.

Moreover, in alternative embodiments, the inner cover layer formulation may also comprise a soft, low modulus non-ionomeric thermoplastic elastomer including a polyester polyurethane such as B.F. Goodrich Company's Estane® polyester polyurethane X-4517. According to B.F. GOODRICH, Estane® X-4517 has the following properties as shown in Table 11:

TABLE 11

Properties of Estane ® X-4517

| Tensile | 1430 |
|---|---|
| 100% | 815 |
| 200% | 1024 |
| 300% | 1193 |
| Elongation | 641 |
| Youngs Modulus | 1826 |
| Hardness A/D | 88/39 |
| Bayshore Rebound | 59 |
| Solubility in Water | Insoluble |
| Melt processing temperature | >350° F. (>177° C.) |
| Specific Gravity (H$_2$O = 1) | 1.1–1.3 |

Other soft, relatively low modulus non-ionomeric thermoplastic elastomers may also be utilized to produce the inner cover layer as long as the non-ionomeric thermoplastic elastomers produce the playability and durability characteristics desired without adversely effecting the enhanced spin characteristics produced by the low acid ionomer resin compositions. These include, but are not limited to thermoplastic polyurethanes such as: Texin thermoplastic polyurethanes from Mobay Chemical Co. and the Pellethane thermoplastic polyurethanes from Dow Chemical Co.; Ionomer/rubber blends such as those in Spalding U.S. Pat. Nos. 4,986,545; 5,098,105 and 5,187,013; and, Hytrel polyester elastomers from DuPont and pebax polyesteramides from Elf Atochem S.A.

Similarly, a castable, thermosetting polyurethane produced by BASF under the trade designation Baytec® has also shown enhanced cover formulation properties. According to BASF, Baytec® (such as Baytec® RE 832), relates to a group of reactive elastomers having outstanding wear resistance, high mechanical strength, high elasticity and good resistance to weathering, moisture and chemicals. The Baytec® RE-832 system gives the following typical physical properties as set forth in Table 12:

TABLE 12

| Property | ASTM Test Method | Unit | Value |
|---|---|---|---|
| Tear Strength Die C | D624 | psi | 180 |
| Stress at | | | |
| 100% Modulus | D412 | psi | 320 |
| 200% Modulus | | | 460 |
| 300% Modulus | | | 600 |
| Ultimate Strength | D412 | psi | 900 |
| Elongation at Break | D412 | % | 490 |
| Taber Abrasion | D460, H-18 | mg/100 cycles | 350 |

| Component[1] Properties | Part A (Isocyanate) | Part B (Resin) |
|---|---|---|
| Viscosity @ 25° C., mPa · s | 2500 | 2100 |
| Density @ 25° C., g/cm | 1.08 | 1.09 |
| NCO, % | 9.80 | — |
| Hydroxyl Number, Mg KOH/g | — | 88 |

[1]Component A is a modified diphenylmethane diisocyanate (mDI) prepolymer and component B is a polyether polyol blend.

The weight of the cover layers is increased in the present invention by making the cover layers thicker and through the inclusion of about 1 to about 100 parts per 100 parts resin of metal particles and other heavy weight filler materials. As used herein, the term "heavy weight filler materials" is defined as any material having a specific gravity greater than 1.0. This term "heavy weight filler materials" is used interchangeably with the term "weighting material" as also used herein.

As noted above, it has been found that increasing the weight of the ball towards the outer perimeter produces an increase in the ball's moment of inertia. Preferably, the particles (or flakes, fragments, fibers, etc.) of heavy filler are added to the inner cover layer as opposed to the outer cover, in order to increase the moment of inertia of the ball without affecting the ball's feel and durability characteristics. However, as described herein, it may in some instances be preferred to incorporate weighting materials or heavy filler in the outer cover. This is particularly the case when producing a golf ball having a visible weighting system as described herein.

The inner layer is filled with one or more of a variety of reinforcing or non-reinforcing heavy weight fillers or fibers such as metal (or metal alloy) powders, carbonaceous materials (i.e., graphite, carbon black, cotton flock, leather fiber, etc.), glass, Kevlar® fibers (trademarked material of Du Pont for an aromatic polyamide fiber of high tensile strength and greater resistance of elongation than steel), etc. These heavy weight filler materials range in size from about 10 mesh to about 325 mesh, preferably about 20 mesh to about 325 mesh and most preferably about 100 mesh to about 325 mesh. Representatives of such metal (or metal alloy) powders include but are not limited to, bismuth powder, boron powder, brass powder, bronze powder, cobalt powder, copper powder, inconel metal powder, iron metal powder, molybdenum powder, nickel powder, stainless steel powder, titanium metal powder, zirconium oxide powder, aluminum flakes, and aluminum tadpoles. It will be understood that the foregoing materials may be in other forms besides powders.

Examples of various suitable heavy filler materials which can be included in the present invention are as follows as shown in Table 13:

TABLE 13

| Filler Type | Spec. Gravity |
|---|---|
| graphite fibers | 1.5–1.8 |
| precipitated hydrated silica | 2.0 |
| clay | 2.62 |
| talc | 2.85 |
| asbestos | 2.5 |
| glass fibers | 2.55 |
| aramid fibers (Kevlar ®) | 1.44 |
| mica | 2.8 |
| calcium metasilicate | 2.9 |
| barium sulfate | 4.6 |
| zinc sulfide | 4.1 |
| silicates | 2.1 |
| diatomaceous earth | 2.3 |
| calcium carbonate | 2.71 |
| magnesium carbonate | 2.20 |
| Metals and Alloys (powders) | |
| titanium | 4.51 |
| tungsten | 19.35 |
| aluminum | 2.70 |
| bismuth | 9.78 |
| nickel | 8.90 |
| Filler Type | |
| molybdenum | 10.2 |
| iron | 7.86 |
| copper | 8.94 |
| brass | 8.2–8.4 |
| boron | 2.364 |
| bronze | 8.70–8.74 |
| cobalt | 8.92 |
| beryllium | 1.84 |
| zinc | 7.14 |
| tin | 7.31 |
| Metal Oxides | |
| zinc oxide | 5.57 |
| iron oxide | 5.1 |
| aluminum oxide | 4.0 |
| titanium dioxide | 3.9–4.1 |
| magnesium oxide | 3.3–3.5 |
| zirconium oxide | 5.73 |
| Metal Stearates | |
| zinc stearate | 1.09 |
| calcium stearate | 1.03 |
| barium stearate | 1.23 |
| lithium stearate | 1.01 |
| magnesium stearate | 1.03 |
| Particulate carbonaceous materials | |
| graphite | 1.5–1.8 |
| carbon black | 1.8 |
| natural bitumen | 1.2–1.4 |
| cotton flock | 1.3–1.4 |
| cellulose flock | 1.15–1.5 |
| leather fiber | 1.2–1.4 |

The amount and type of heavy weight filler material utilized is dependent upon the overall characteristics of the low spinning multi-layered golf ball desired. Generally, lesser amounts of high specific gravity materials are necessary to produce an increase in the moment of inertia in comparison to low specific gravity materials. Furthermore, handling and processing conditions can also affect the type of heavy weight filler material incorporated into cover layers. In this regard, Applicant has found that the inclusion of approximately 10 phr brass powder into an inner cover layer produces the desired increase in the moment of inertia without involving substantial processing changes. Thus, 10 phr brass powder is generally, the most preferred heavy filler material at the time of this writing.

The present invention also provides particular patterns of weighting materials disposed proximate or generally within the outer periphery of a golf ball. The use of a weighted perimeter has been found to increase a ball's moment of inertia and reduce the overall spin rate. In a most preferred embodiment, golf balls with weighted perimeters utilize a visible pattern of weighting material disposed along a portion of the outer periphery of the ball. Although not wishing to be bound to any particular theory, it is believed that characteristics and properties of a weighted perimeter ball in accordance with the present invention are affected, or at least influenced by, the shape or configuration of the pattern of weighting material along the ball's outer periphery. Moreover, for the most preferred embodiment balls utilizing a visible pattern of weighting material, the shape of such pattern can also serve as a unique identifier of the ball. Furthermore, by providing a weighting system that is visible or otherwise viewable along a golf ball's exterior, a consumer may readily determine whether a particular golf ball comprises a weighting system.

Figure 3:
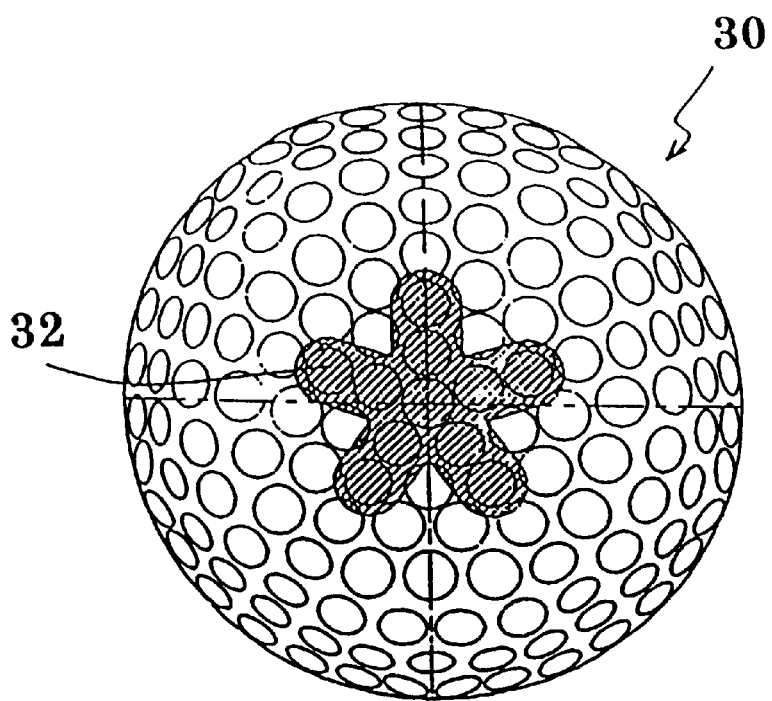
FIG. 3 is an elevational view of a preferred embodiment golf ball in accordance with the present invention utilizing a visible star-shaped perimeter weighting system.

The present invention provides an array of particularly preferred patterns of weighting material. FIG. 3 illustrates a preferred embodiment golf ball 30 in accordance with the present invention utilizing a visible star-shaped perimeter weighting system 32. This system comprises a first pattern preferably centered about a dimple, and having a plurality, namely five (5), radially extending arms extending outward from the center of the pattern or dimple. The sides of each radially extending arm intersect with the sides of adjacent radially extending arms. The distal end of each radially extending arm is preferably rounded. The golf ball 30 further comprises a second visible star-shaped perimeter weighting system pattern located on the opposite side of the ball 30. This second pattern is most preferably directly opposite from the first pattern and is of equal size and mass as the first pattern. These considerations are described in greater detail below.

Figure 4:
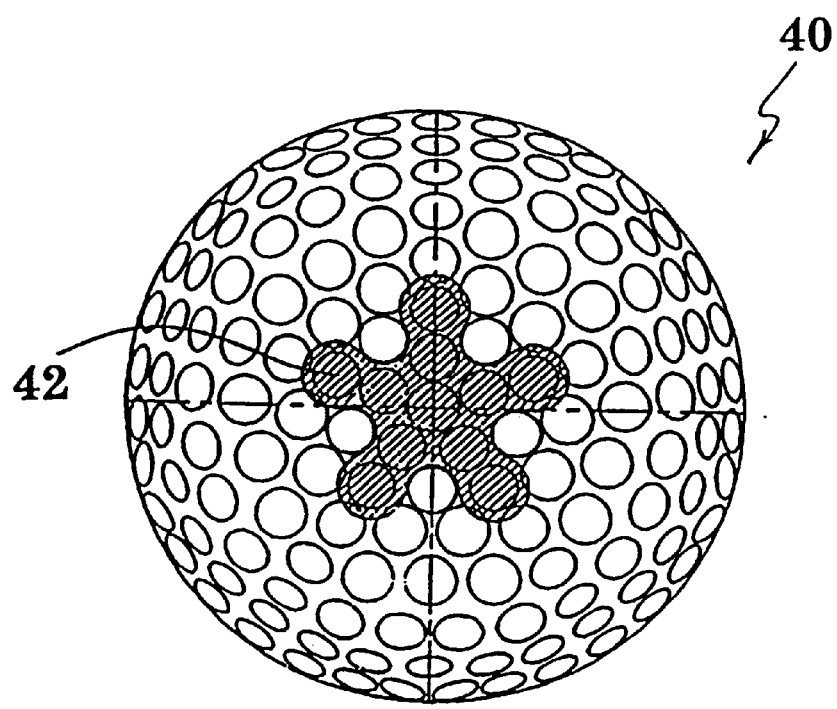
FIG. 4 is an elevational view of a preferred embodiment golf ball in accordance with the present invention utilizing a visible contoured-shaped perimeter weighting system.

FIG. 4 is an elevational view of a preferred embodiment golf ball 40 in accordance with the present invention utilizing a contoured-shaped perimeter weighting system 42. This system comprises patterns similar to the star-shaped pattern depicted in FIG. 3 except that generally continuous arcuate sections extend between and connect the sides of adjacent radially extending arms. The golf ball 40 further comprises a second visible contoured-shaped perimeter weighting system pattern located on the opposite side of the ball 40. This second pattern is most preferably directly opposite from the first pattern and is of equal size and mass as the first pattern.

Figure 5:
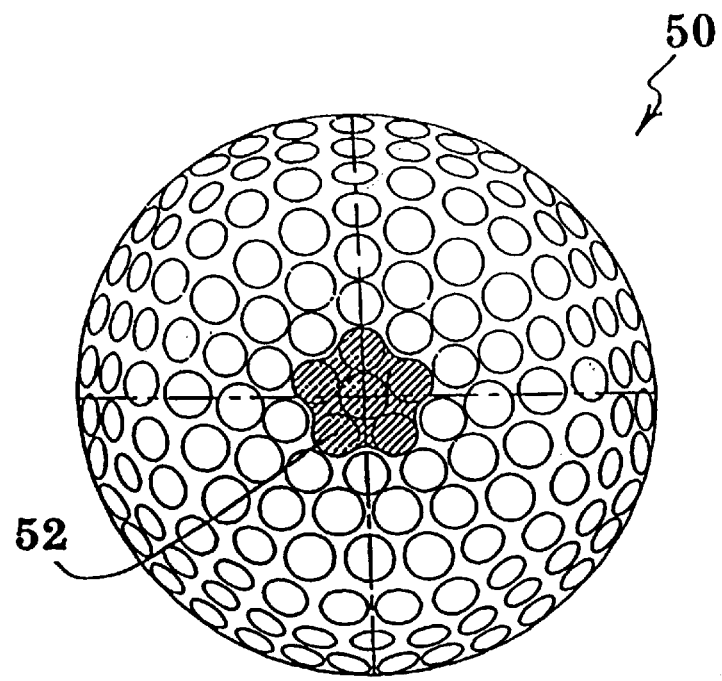
FIG. 5 is an elevational view of a preferred embodiment golf ball in accordance with the present invention utilizing a visible pentagon-shaped perimeter weighting system.

FIG. 5 illustrates a preferred embodiment golf ball 50 in accordance with the present invention utilizing a pentagon-shaped perimeter weighting system 52. It can be seen that the pentagon shape is symmetrically disposed about a center dimple and five (5) adjacent or surrounding dimples. Additionally, each side of the pentagon is slightly curved inward so as to not extend over a neighboring dimple. The golf ball 50 further comprises a second visible pentagon-shaped perimeter weighting system pattern located on the opposite side of the ball 50. The second pattern is most preferably directly opposite from the first pattern and is of equal size and mass as the first pattern.

Figure 6:
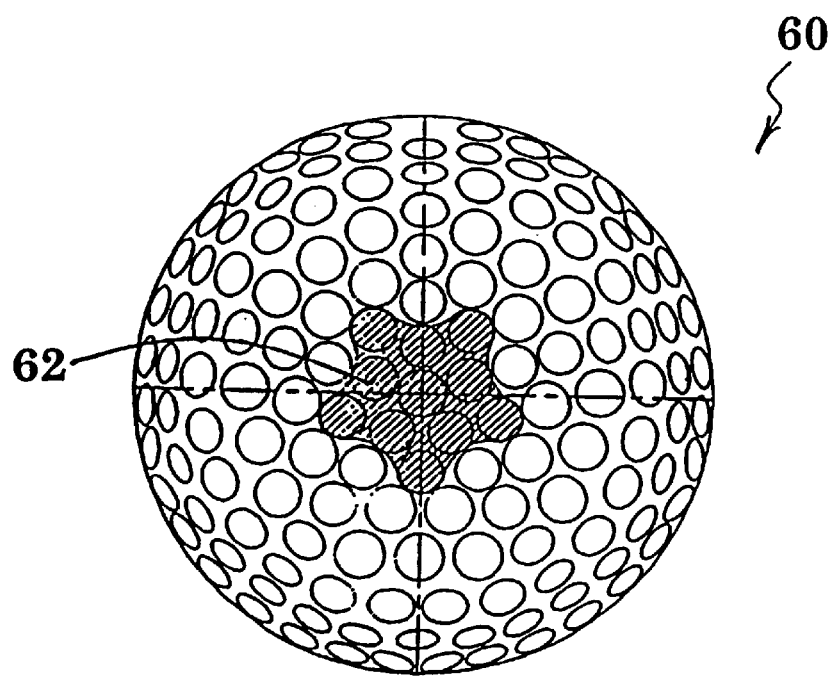
FIG. 6 is an elevational view of a preferred embodiment golf ball in accordance with the present invention utilizing a visible radiused pentagon-shaped perimeter weighting system.

FIG. 6 illustrates a preferred embodiment golf ball 60 in accordance with the present invention utilizing a visible radiused pentagon-shaped perimeter weighting system 62. This pattern is also symmetrically disposed over a center dimple and the five (5) perimeter dimples, like the pentagon pattern depicted in FIG. 5. This pattern of the system 62 also extends over an additional five (5) dimples. The golf ball 60 further comprises a second visible radiused pentagon-shaped perimeter weighting system pattern located on the opposite side of the ball 60. The second pattern is most preferably directly opposite from the first pattern and is of equal size and mass as the first pattern.

Figure 7:
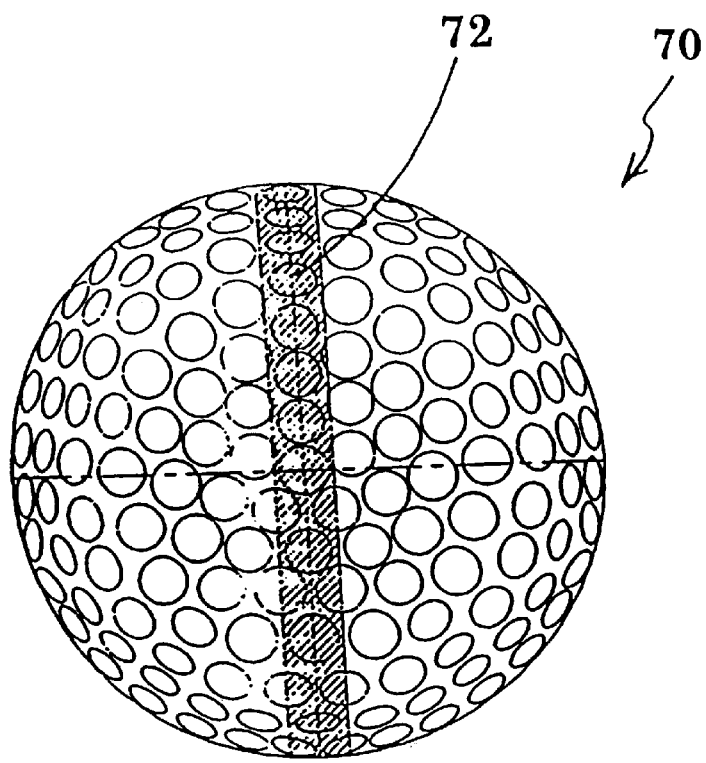
FIG. 7 is an elevational view of a preferred embodiment golf ball in accordance with the present invention utilizing a visible single stripe-shaped perimeter weighting system.

FIG. 7 is an elevational view of a preferred embodiment golf ball 70 in accordance with the present invention utilizing a visible single stripe perimeter weighting system 72. It can be seen in FIG. 7 that the stripe is approximately slightly larger in width than the diameter of a typical dimple on the golf ball 70. The stripe preferably extends around the circumference of the ball 70.

Figure 8:
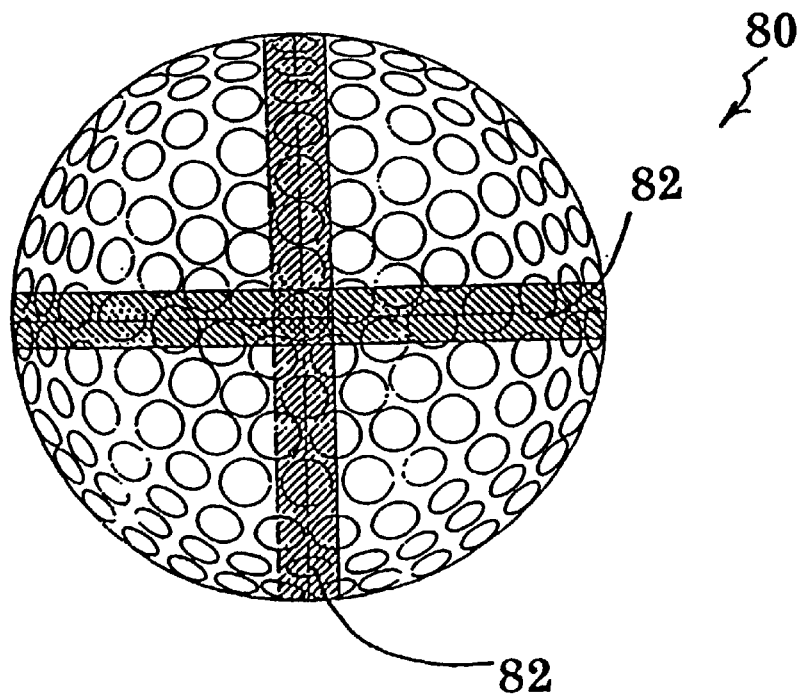
FIG. 8 is an elevational view of a preferred embodiment golf ball in accordance with the present invention utilizing a visible double stripe-shaped perimeter weighting system.

FIG. 8 illustrates a preferred embodiment golf ball 80 in accordance with the present invention utilizing a double striped perimeter weighting system 82. It can be seen that the stripes preferably intersect one another at right angles, and that the width of each stripe is approximately only slightly greater than the diameter of a typical dimple on the ball 80. Each stripe preferably extends around the circumference of the ball 80. It is also preferred that the stripes are equal in width, or approximately so.

Figure 9:
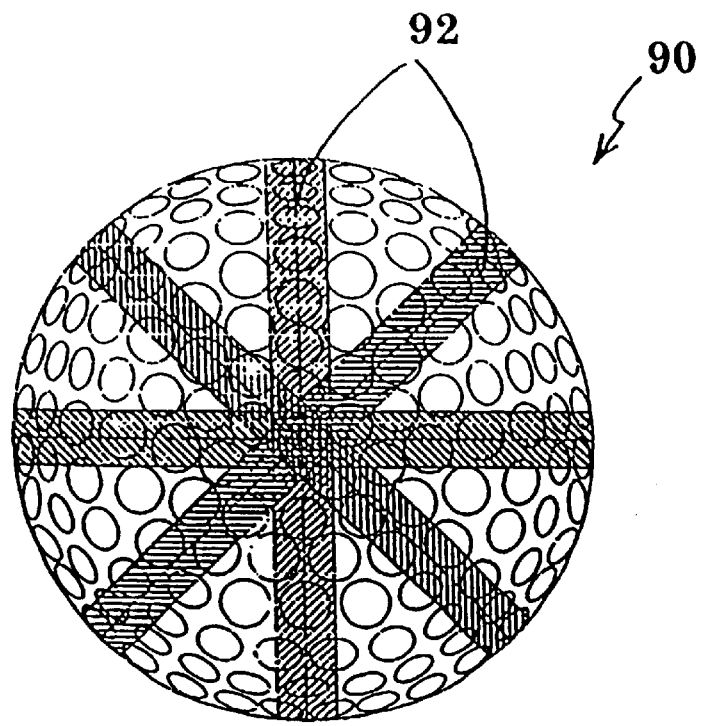
FIG. 9 is an elevational view of a preferred embodiment golf ball in accordance with the present invention utilizing a visible multi stripe-shaped perimeter weighting system.

FIG. 9 is an elevational view of a preferred embodiment golf ball 90 in accordance with the present invention utilizing a multi-stripe perimeter weighting system 92. As shown in FIG. 9, the multi stripe perimeter weighting system 92 comprises preferably four (4) stripes, intersecting one another at a common point of intersection. Again, the width of each stripe is preferably approximately slightly greater than the diameter of a typical dimple on the ball 90. And, the stripes are of equal width. Each stripe preferably extends around the circumference of the ball 90.

Figure 10:
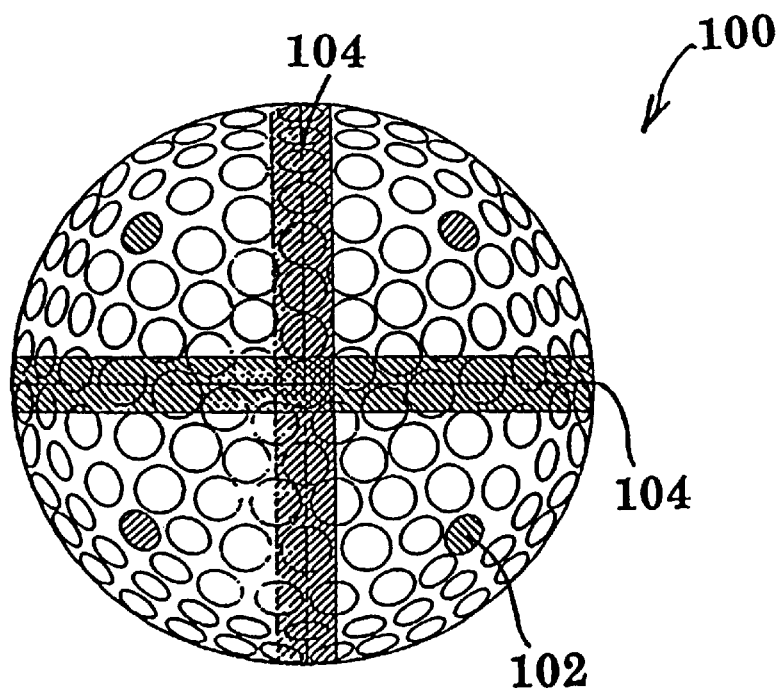
FIG. 10 is an elevational view of a preferred embodiment golf ball in accordance with the present invention utilizing a visible stripe and dimple-shaped perimeter weighting system.

FIG. 10 illustrates a preferred embodiment golf ball 100 in accordance with the present invention utilizing a visible stripe and dimple perimeter weighting system. The system comprises a plurality of stripes 104 and a plurality of dimples 102. Each of the stripes preferably extends around the circumference of the ball 100. Most preferably, the system comprises two (2) intersecting stripes 104, disposed at right angles to one another, and a total of eight (8) dimples 102 as shown in FIG. 10. It will be understood that the other four (4) weighted dimples 102 are located on the other side of the ball 100. The stripes preferably are of equal width.

Figure 11:
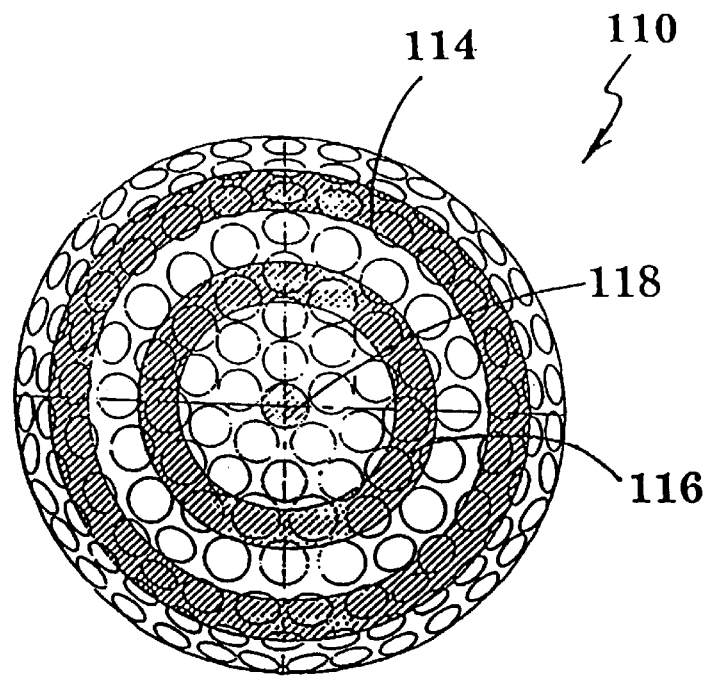
FIG. 11 is an elevational view of a preferred embodiment golf ball in accordance with the present invention utilizing a visible ring-shaped perimeter weighting system.

FIG. 11 illustrates a preferred embodiment golf ball 110 in accordance with the present invention utilizing a ring-shaped perimeter weighting system as shown in FIG. 11. The system comprises a plurality of rings 114 and 116 and a center weighted dimple or spot 118. Preferably, the rings 114 and 116 are concentrically arranged about the center spot 118. Two (2) identical concentrically arranged rings are located on the other side of the ball 110. Most preferably, these rings are directly opposite from the rings 114 and 116, and are of equivalent size and mass as the rings 114 and 116.

Figure 12:
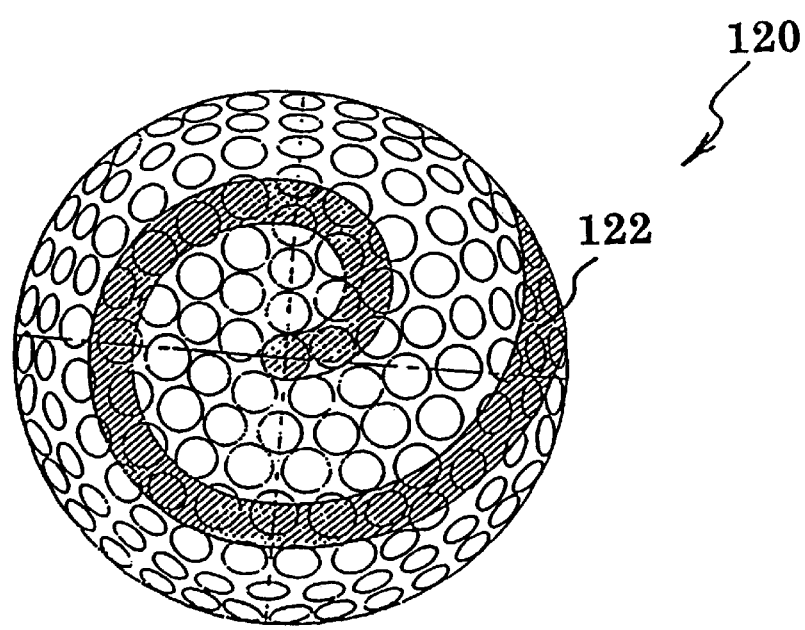
FIG. 12 is an elevational view of a preferred embodiment golf ball in accordance with the present invention utilizing a visible spiral-shaped perimeter weighting system.

FIG. 12 is an elevational view of a preferred embodiment golf ball 120 in accordance with the present invention utilizing a first spiral-shaped perimeter weighting system 122. It will be understood that an identical second spiral-shaped pattern is located on the other side of the ball 120. Most preferably, the second spiral pattern is of equivalent size and mass as the first pattern and is directly opposite from the first pattern.

It will be understood that in all of the foregoing preferred embodiments, it is particularly preferred that the center of mass of the weighted ball coincides with the geometrical center of the ball, i.e., its centerpoint. This is the primary reason for providing a second identical pattern of weighting material on an opposite side from a first pattern. If a single pattern of weighting material is provided on only one side of a ball, the resulting center of mass of the ball will be offset from the ball's centerpoint.

In addition to the above noted ionomers, compatible additive materials may also be added to produce the cover compositions of the present invention. These additive materials include dyes (for example, Ultramarine Blue sold by Whitaker, Clark, and Daniels of South Painsfield, N.J.), and pigments, i.e. white pigments such as titanium dioxide (for example Unitane 0–110) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable optical brighteners which can be used in accordance with this invention are Uvitex OB as sold by the Ciba-Geigy Chemical Company, Ardsley, N.Y. Uvitex OB is thought to be 2,5-Bis(5-tert-butyl-2-benzoxazoly)thiophene. Examples of other optical brighteners suitable for use in accordance with this invention are as follows: Leucopure EGM as sold by Sandoz, East Hanover, N.J. 07936. Leucopure EGM is thought to be 7-(2n-naphthol(1,2-d)-triazol-2yl)-3phenyl-coumarin. Phorwhite K-20G2 is sold by Mobay Chemical Corporation, P.O. Box 385, Union Metro Park, Union, N.J. 07083, and is thought to be a pyrazoline derivative, Eastobrite OB-1 as sold by Eastman Chemical Products, Inc. Kingsport, Tenn., is thought to be 4,4-Bis(-benzoxaczoly) stilbene. The above-mentioned Uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.020% depending on the optical properties of the particular optical brightener used and the polymeric environment in which it is a part.

Generally, the additives are admixed with a ionomer to be used in the cover composition to provide a masterbatch (M.B.) of desired concentration and an amount of the masterbatch sufficient to provide the desired amounts of additive is then admixed with the copolymer blends.

The above cover compositions, when processed according to the parameters set forth below and combined with soft cores at thicknesses defined herein to produce covers having a Shore D hardness of 65, provide golf balls with reduced spin ratio. It is noted, however, that the high acid ionomer resins provide for more significant reduction in spin rate than that observed for the low acid ionomer resins.

The cover compositions and molded balls of the present invention may be produced according to conventional melt blending procedures. In this regard, the ionomeric resins are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about the soft polybutadiene cores to produce a golf ball having a diameter of about 1.680 inches or greater and weighing about 1.620 ounces. In an additional embodiment of the invention, larger molds are utilized to produce the thicker covered oversized golf balls. As indicated, the golf balls of the present invention can be produced by forming covers consisting of the compositions of the invention around the softer polybutadiene cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200–300° F. for 2–10 minutes, followed by cooling at 50–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further finishing steps such as buffing, painting, and marking as disclosed in U.S. Pat. No. 4,911,451.

In an alternative embodiment, the resulting ball is larger than the standard 1.680 inch golf ball. Its diameter is in the range of about 1.680 to 1.800 inches, more likely in the range of about 1.700 to 1.800 inches, preferably in the range of 1.710–1.730 inches, and most preferably in the range of about 1.717–1.720 inches. The larger diameter of the golf ball results from the cover thickness which ranges from more than the standard 0.0675 inches up to about 0.130, preferably from about 0.0675 to about 0.1275 inches, more preferably in the range of about 0.0825 to 0.0925, and most preferably in the range of about 0.0860 to 0.0890 inches. The core is of a standard size, roughly about 1.540 to 1.545 inches.

The invention has been described with reference to the preferred embodiments. Obviously, modifications and alterations will occur to others upon a reading and understanding of the preceding detailed description. It is intended that the invention be construed as including all such alterations and modifications insofar as they come within the scope of the appended claims or the equivalents thereof.

Having thus described the invention, we claim:

1. A golf ball comprising:
    a core having a Riehle compression of at least about 75; and
    an outer layer disposed around said core, said outer layer including at least one discrete region of weighting material that serves to increase the moment of inertia of said golf ball, wherein said at least one region of weighting material is visible along the exterior of said golf ball, said outer layer having a Shore D hardness of at least about 65, wherein said at least one discrete region of weighting material is in the form of a perimeter weighting pattern selected from the group consisting of a visible star-shaped perimeter weighting pattern, a visible contour-shaped perimeter weighting pattern, a visible pentagon-shaped perimeter weighting pattern, a visible radiused pentagon-shaped perimeter weighting pattern, a visible single stripe-shaped perimeter weighting pattern, a double stripe-shaped perimeter weighting pattern, a multi-stripe-shaped perimeter weighting pattern, a stripe and dimple-shaped perimeter weighting pattern, a ring-shaped perimeter weighting pattern, and a spiral-shaped perimeter weighting pattern.

2. The golf ball of claim 1 wherein said at least one discrete region of weighting material is in the form of a visible contoured-shaped perimeter weighting pattern.

3. The golf ball of claim 1 wherein said at least one discrete region of weighting material is in the form of a visible pentagon-shaped perimeter weighting pattern.

4. The golf ball of claim 1 wherein said at least one discrete region of weighting material is in the form of a visible radiused pentagon-shaped perimeter weighting pattern.

5. The golf ball of claim 1 wherein said at least one discrete region of weighting material is in the form of a visible single stripe-shaped perimeter weighting pattern.

6. The golf ball of claim 1 wherein said at least one discrete region of weighting material is in the form of a double stripe-shaped perimeter weighting pattern.

7. The golf ball of claim 1 wherein said at least one discrete region of weighting material is in the form of a multi-stripe-shaped perimeter weighting pattern.

8. The golf ball of claim 1 wherein said at least one discrete region of weighting material is in the form of a stripe and dimple-shaped perimeter weighting pattern.

9. The golf ball of claim 1 wherein said at least one discrete region of weighting material is in the form of a ring-shaped perimeter weighting pattern.

10. The golf ball of claim 1 wherein said at least one discrete region of weighting material is in the form of a spiral-shaped perimeter weighting pattern.

11. The golf ball of claim 1 wherein said layer disposed about said core is comprised of at least one high acid ionomer resin comprising a copolymer of about 17% to about 25% by weight of an alpha, beta-unsaturated carboxylic acid, and an alpha olefin of which about 10 to about 90% of the carboxyl groups of the copolymer are neutralized with a metal cation.

* * * * *

UNITED STATES PATENT AND TRADEMARK OFFICE
CERTIFICATE OF CORRECTION

PATENT NO. : 6,648,778 B2  
DATED : November 18, 2003  
INVENTOR(S) : Micheal J. Sullivan and R. Dennis Nesbitt It is certified that error appears in the above-identified patent and that said Letters Patent is hereby corrected as shown below:

<u>Title page,</u>
Item [63], Related U.S. Application Data, should be corrected as follows:
-- Division of application No. 09/248,627, filed on Feb. 11, 1999, now Pat. No. 6,261,193, which is a continuation-in-part of application No. 08/716,016, filed on Sep. 19, 1996, now Pat. No. 5,820,489, which is a division of application No. 08/255,442, filed on Jun. 8, 1994, now abandoned, which is a continuation of application No. 08/054,406, filed on Apr. 28, 1993, now Pat. No. 5,368,304. Application No. 09/248,627, is a continuation-in-part of application No. 09/049,868, filed on Mar. 27, 1998, now Pat. No. 5,984,806, which is a continuation-in-part of application No. 08/782,221, filed on Jan. 13, 1997, now Pat. No. 6,015,356. --

Signed and Sealed this

Thirtieth Day of March, 2004

JON W. DUDAS  
*Acting Director of the United States Patent and Trademark Office*